United States Patent [19]
Rosser et al.

[11] Patent Number: 6,100,925
[45] Date of Patent: Aug. 8, 2000

[54] IMAGE INSERTION IN VIDEO STREAMS USING A COMBINATION OF PHYSICAL SENSORS AND PATTERN RECOGNITION

[75] Inventors: Roy J. Rosser, Princeton; Yi Tan, Plainsboro; Howard J. Kennedy, Jr., Hamilton Square, all of N.J.; James L. Jeffers, Yardley, Pa.; Darrell S. DiCicco, Cream Ridge; Ximin Gong, Somerset, both of N.J.

[73] Assignee: Princeton Video Image, Inc., Lawrenceville, N.J.

[21] Appl. No.: 09/230,099
[22] PCT Filed: Nov. 25, 1997
[86] PCT No.: PCT/US97/21607
§ 371 Date: Jan. 19, 1999
§ 102(e) Date: Jan. 19, 1999
[87] PCT Pub. No.: WO98/24242
PCT Pub. Date: Jun. 4, 1998

Related U.S. Application Data
[60] Provisional application No. 60/038,143, Nov. 27, 1996.
[51] Int. Cl.[7] ............................................. H04N 7/18
[52] U.S. Cl. .................................... 348/169; 348/584
[58] Field of Search ................................. 348/169, 584, 348/588, 590; 382/103, 284

[56] References Cited

U.S. PATENT DOCUMENTS

| | | | |
|---|---|---|---|
| 5,264,933 | 11/1993 | Rosser | 348/578 |
| 5,436,672 | 7/1995 | Medioni | 348/591 |
| 5,488,675 | 1/1996 | Hanna | 348/589 |
| 5,491,517 | 2/1996 | Kreitman | 348/581 |
| 5,566,251 | 10/1996 | Hanna | 348/589 |

Primary Examiner—Bryan Tung
Attorney, Agent, or Firm—Sterne, Kessler, Goldstein & Fox PLLC

[57] ABSTRACT

A live video insertion system (LVIS) is disclosed that allows insertion of static or dynamic images into a live video broadcast in a realistic fashion on a real time basis. Initially, natural landmarks in a scene that are suitable for subsequent detection and tracking are selected. The landmarks are typically distributed throughout the entire scene, such as a ballpark or football stadium. The field of view of the camera at any instant is normally significantly smaller than the full scene that may be panned. The LVIS uses a combination of pattern recognition techniques and camera sensor data (e.g., pan, tilt, zoom, etc.) to locate, verify and track target data. Camera sensors are well suited for the searching requirements of an LVIS, while pattern recognition and landmark tracking techniques are better suited for the image tracking requirements of LVIS.

29 Claims, 13 Drawing Sheets

| ID | LEV | X | Y | TName | LxT | (Lnk ATTRIBUTES) |
|----|-----|---|---|-------|-----|------------------|
| 0  | 1 | 36.718  | 36.000  | vM7 | 9000 | v1 |
| 1  | 1 | 75.912  | 36.000  | vM7 | 9000 | v1 |
| 2  | 1 | 101.269 | 36.000  | vM7 | 9000 | v1 |
| 3  | 1 | 179.776 | 36.000  | vM7 | 9000 | v1 |
| 4  | 1 | 227.794 | 36.000  | vM7 | 9000 | v1 |
| 5  | 1 | 261.520 | 36.000  | vM7 | 9000 | v1 |
| 6  | 1 | 297.343 | 36.000  | vM7 | 9000 | v1 |
| 7  | 1 | 320.523 | 36.000  | vM7 | 9000 | v1 |
| 8  | 0 | 114.000 | 106.448 | hM1 | 6148 | h. |
| 9  | 0 | 179.000 | 106.716 | hM1 | 6148 | h. |
| 10 | 0 | 240.000 | 106.555 | hM1 | 6148 | h. |
| 11 | 0 | 310.000 | 106.747 | hM1 | 6148 | h. |
| 12 | 0 | 400.000 | 106.848 | hM1 | 6148 | h. |
| 13 | 0 | 480.000 | 106.724 | hM1 | 6148 | h. |
| 14 | 0 | 540.000 | 106.988 | hM1 | 6148 | h. |
| 15 | 0 | 619.000 | 107.580 | hM1 | 6148 | h. |
| 16 | 0 | 700.000 | 107.748 | hM1 | 6148 | h. |

31, 33

FIG. 13
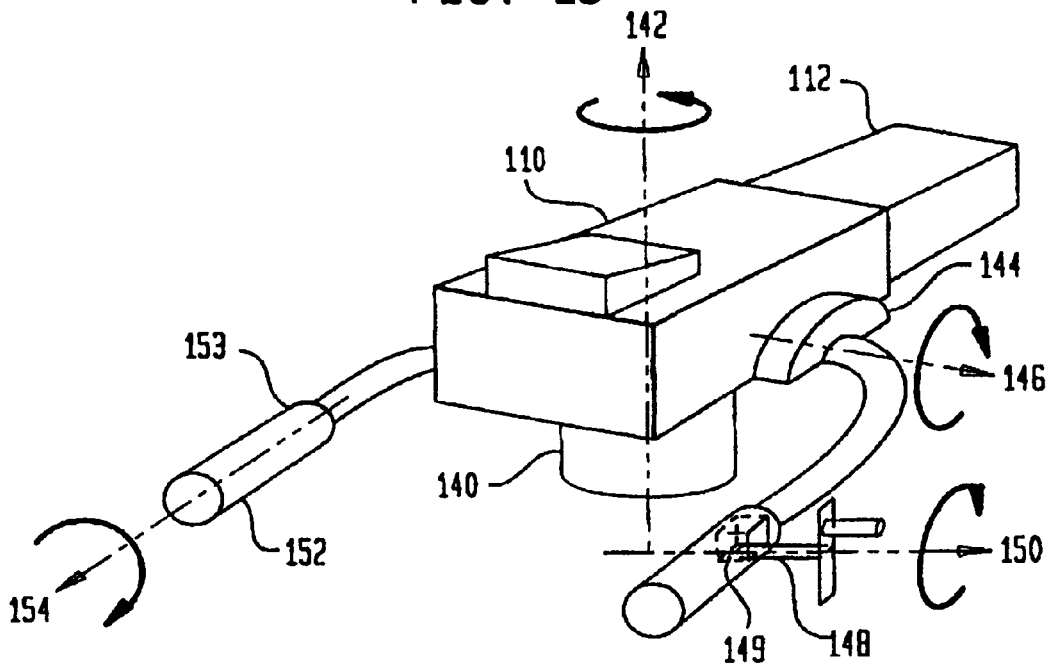
FIG. 14
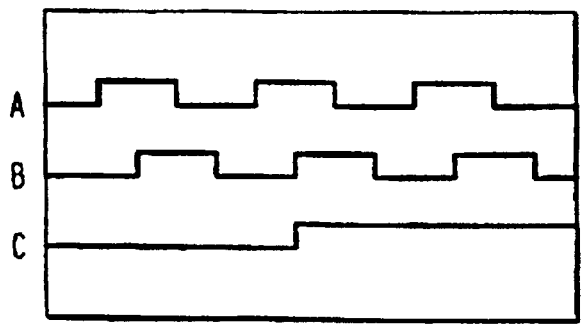
FIG. 15
| TRANSITION OF A | HI TO LO | | LO TO HI | |
|---|---|---|---|---|
| STATE OF B | HI | LO | HI | LO |
| DIRECTION | CW | CCW | CCW | CW |

IMAGE INSERTION IN VIDEO STREAMS USING A COMBINATION OF PHYSICAL SENSORS AND PATTERN RECOGNITION

CROSS-REFERENCE TO RELATED APPLICATIONS

The present application is related to and claims the benefit of U.S. Provisional Application Ser. No. 60/038,143 filed on Nov. 27, 1996 entitled "IMAGE INSERTION IN VIDEO STREAMS USING A COMBINATION OF PHYSICAL SENSORS AND PATTERN RECOGNITION".

The present application is also related to the following co-pending commonly owned applications: Ser. No. 08/563,598 filed Nov. 28, 1995 entitled "SYSTEM AND METHOD FOR INSERTING STATIC AND DYNAMIC IMAGES INTO A LIVE VIDEO BROADCAST"; Ser. No. 08/580,892 filed Dec. 29, 1995 entitled "METHOD OF TRACKING SCENE MOTION FOR LIVE VIDEO INSERTION SYSTEMS"; Ser. No. 08/662,089 filed Jun. 12, 1996 entitled "SYSTEM AND METHOD OF REAL-TIME INSERTIONS INTO VIDEO USING ADAPTIVE OCCLUSION WITH A SYNTHETIC COMMON REFERENCE IMAGE"; and Ser. No. 60/031,883 filed Nov. 27, 1996 entitled "CAMERA TRACKING USING PERSISTANT, SELECTED, IMAGE TEXTURE TEMPLATES" The foregoing applications are all incorporated herein by reference.

BACKGROUND OF THE INVENTION

1. Field of the Invention

This invention relates to a system and method for tracking image frames for inserting realistic indicia into video images.

2. Description of Related Art

Electronic devices for inserting electronic images into live video signals, such as described in U.S. Pat. No. 5,264,933 by Rosser, et al., have been developed and used for the purpose of inserting advertising and other indicia into broadcast events, primarily sports events. These devices are capable of seamlessly and realistically incorporating logos or other indicia into the original video in real time, even as the original scene is zoomed, panned, or otherwise altered in size or perspective. Other examples include U.S. Pat. No. 5,488,675 issued to Hanna and U.S. Pat. No. 5,491,517 issued to Kreitman, et al.

Making the inserted indicia look as if it is actually in the scene is an important but difficult aspect of implementing the technology. A troublesome aspect is that the eye of the average viewer is very sensitive to small changes in the relative position of objects from field to field. Experimentally, instances have been found where relative motion of an inserted logo by as little as one tenth of one pixel of an NTSC television image is perceptible to a viewer. Placing, and consistently maintaining to a high precision, an inserted indicia in a broadcast environment is crucial in making video insertion technology commercially viable. A broadcast environment includes image noise, the presence of sudden rapid camera motion, the sporadic occurrence of moving objects which may obscure a considerable fraction of the image, distortions in the image due to lens characteristics and changing light levels, induced either by natural conditions or by operator adjustment, and the vertical interlacing of television signals.

In the prior art, the automatic tracking of image motion has generally been performed by two different methods.

The first method utilizes pattern recognition of the frames and examines the image itself and either follows known landmarks in the video scene, using correlation or difference techniques, or calculates motion using well known techniques of optical flow. See, Horn, B. K. P. and Schunck, B. G., "Determining Optical Flow", *Artificial Intelligence,* pp 185–203 (1981). Landmarks may be transient or permanent and may be a natural part of the scene or introduced artificially. A change in shape and pose of the landmarks is measured and used to insert the required indicia.

The second method, described, for instance, in U.S. Pat. No. 4,084,184 issued to D. W. Crain, uses sensors placed on the camera to provide focal distance, bearing and elevation information. These sensors exist to provide similar landmark positional data within a given camera's field of view.

Pattern Recognition Systems

In the pattern recognition type of image insertion systems developed by Rosser et al., for instance, the system has two distinct modes. First is the search mode wherein each new frame of live video is searched in order to detect and verify a particular target image. Second is the tracking mode, in which the system knows that in the previous frame of video the target image was present. The system further knows the location and orientation of that previous frame with respect to some pre-defined reference coordinate system. The target image locations are tracked and updated with respect to the pre-defined reference coordinate system.

The search mode encompasses pattern recognition techniques to identify certain images. Obtaining positional data via pattern recognition, as opposed to using camera sensors, provides significant system flexibility because it allows live video insertion systems to make an insertion at any point in the video broadcast chain. For instance, actual insertion can be performed at a central site which receives different video feeds from stadiums or arenas around the country or world. The various feeds can be received via satellite or cable or any other means known in the art. Once the insertion is added, the video feed can be sent back via satellite or cable to the broadcast location where it originated, or directly to viewers.

Such pattern recognition search and tracking systems, however, are difficult to implement for some events and are the most vulnerable element prone to error during live video insertion system operation. The Assignee herein, Princeton Video Image, Inc., has devised and programmed robust searches for many venues and events such as baseball, football, soccer and tennis. However, the time and cost to implement similar search algorithms can be prohibitive for other types of events. Pattern recognition searching is difficult for events in which major changes to the look of the venue are made within hours, or even days, of the event. This is because a pre-defined common reference image of the venue is difficult to obtain since the look of the venue is not permanently set. In such cases a more robust approach to the search problem is to utilize sensors attached to one or more of the cameras to obtain target positional data.

Camera Sensor Systems

The drawbacks of relying solely upon camera sensor systems are detailed below. In field trials with televised baseball and football games, previous systems encountered the following specific, major problems.

1. Camera Motion

In a typical sport, such as football or baseball, close up shots are taken with long focal length cameras operating at a distance of up to several hundred yards from the action. Both of these sports have sudden action, namely the kicking or hitting of a ball, which results in the game changing abruptly from a tranquil scene to one of fast moving action. As the long focal length cameras react to this activity, the image they record displays several characteristics which render motion tracking more difficult. For example, the motion of the image may be as fast as ten pixels per field. This will fall outside the range of systems that examine pixel windows that are less than 10 by 10 pixels. Additionally, the images may become defocused and suffer severe motion blurring, such that a line which in a static image is a few pixels wide, blurs out to be 10 pixels wide. This means that a system tracking a narrow line, suddenly finds no match or makes assumptions such as the zoom has changed when in reality only fast panning has occurred. This motion blurring also causes changes in illumination level and color, as well as pattern texture, all of which can be problems for systems using pattern based image processing techniques. Camera motion, even in as little as two fields, results in abrupt image changes in the local and large scale geometry of an image. An image's illumination level and color are affected by camera motion as well.

2. Moving Objects

Sports scenes generally have a number of participants, whose general motion follows some degree of predictability, but who may at any time suddenly do something unexpected. This means that any automatic motion tracking of a real sports event has to be able to cope with sudden and unexpected occlusion of various parts of the image. In addition, the variety of uniforms and poses adopted by players in the course of a game, mean that attempts to follow any purely geometric pattern in the scene have to be able to cope with a large number of occurrences of similar patterns.

3. Lens Distortion

All practical camera lenses exhibit some degree of geometric lens distortion which changes the relative position of objects in an image as those objects move towards the edge of an image. When 1/10th of a pixel accuracy is required, this can cause problems.

4. Noise in the Signal

Real television signals exhibit noise, especially when the cameras are electronically boosted to cover low light level events, such as night time baseball. This noise wreaks havoc with image analysis techniques which rely on standard normalized correlation recognition, as these match pattern shapes, irrespective of the strength of the signal. Because noise shapes are random, in the course of several hundred thousand fields of video (or a typical three hour game), the chances of mistaking noise patterns for real patterns can be a major problem.

5. Field-to-Field Interlace

Television images, in both NTSC and PAL standards, are transmitted in two vertically interlaced fields which together make up a frame. This means that television is not a single stream of images, but two streams of closely related yet subtly different images. The problem is particularly noticeable in looking at narrow horizontal lines, which may be very evident in one field but not the other.

6. Illumination and Color Chance

Outdoor games are especially prone to illumination and color changes. Typically, a summer night baseball game will start in bright sunlight and end in floodlight darkness. An illumination change of a factor of more than two is typical in such circumstances. In addition the change from natural to artificial lighting changes the color of the objects in view. For instance, at Pro Player Park in Florida, the walls appear blue under natural lighting but green under artificial lighting.

7. Setup Differences

Cameras tend to be set up with small but detectable differences from night to night. For instance, camera tilt typically varies by up to plus or minus 1%, which is not immediately obvious to the viewer. However, this represents plus or minus 7 pixels and can be a problem to typical templates measuring 8 pixels by 8 pixels.

The advantages of camera sensors include the ability to be reasonably sure of which camera is being used and where it is pointing and at what magnification the camera is viewing the image. Although there may be inaccuracies in the camera sensor data due to inherent mechanical uncertainties, such as gear back-lash, these inaccuracies will never be large, a camera sensor system will, for instance, not miss-recognize an umpire as a goal post, or "think" that a zoomed out view of a stadium is a close up view of the back wall. It will also never confuse motion of objects in the foreground as being movement of the camera itself.

What is needed is a system that combines the advantages of both pattern recognition systems and camera sensor systems for searching and tracking scene motion while eliminating or minimizing the disadvantages of each. The primary difficulty in implementing a pattern recognition/camera sensor hybrid insertion system is the combining and/or switching between data obtained by the two completely different methods. If not done correctly, the combination or switch over gives unstable results which show up as the inserted image jerking or vibrating within the overall image. Overcoming this difficulty is crucial to making a hybrid system work well enough for broadcast quality.

SUMMARY OF THE INVENTION

By way of background, an LVIS, or live video insertion system, is described in commonly owned application Ser. No. 08/563,598 filed Nov. 28, 1995 entitled "SYSTEM AND METHOD FOR INSERTING STATIC AND DYNAMIC IMAGES INTO A LIVE VIDEO BROADCAST". An LVIS is a system and method for inserting static or dynamic images into a live video broadcast in a realistic fashion on a real time basis. Initially, natural landmarks in a scene that are suitable for subsequent detection and tracking are selected. Landmarks preferably comprise sharp, bold, and clear vertical, horizontal, diagonal or corner features within the scene visible to the video camera as it pans and zooms. Typically, at least three or more natural landmarks are selected. It is understood that the landmarks are distributed throughout the entire scene, such as a baseball park or a football stadium, and that the field of view of the camera at any instant is normally significantly smaller than the full scene that may be panned. The landmarks are often located outside of the destination point or area where the insert will be placed because the insert area is typically too small to include numerous identifiable landmarks and the insertable image may be a dynamic one and, therefore, it has no single, stationary target destination.

The system models the recognizable natural landmarks on a deformable two-dimensional grid. An arbitrary, non-landmark, reference point is chosen within the scene. The reference point is mathematically associated with the natural landmarks and is subsequently used to locate the insertion area.

Prior to the insertion process, artwork of the image to be inserted is adjusted for perspective, i.e., shape. Because the system knows the mathematical relationship between the landmarks in the scene, it can automatically determine the zoom factor and X, Y position adjustment that must be applied. Thereafter, when the camera zooms in and out and changes its field of view as it pans, the insertable image remains properly scaled and proportioned with respect to the other features in the field of view so that it looks natural to the home viewer. The system can pan into and out of a scene and have the insertable image naturally appear in the scene rather than "pop up" as has been the case with some prior art systems. The system can easily place an insertable image at any location.

The present invention is a hybrid live video insertion system (LVIS) using a combination of pattern recognition techniques just described as well as others and camera sensor data to locate, verify and track target data. Camera sensors are well suited to the search and detection, i.e. recognition, requirements of an LVIS while pattern recognition and landmark tracking techniques, including co-pending provisional application Ser. No. 60/031,883 filed Nov. 27, 1996 entitled "CAMERA TRACKING USING PERSISTANT, SELECTED, IMAGE TEXTURE TEMPLATES", are better suited for the image tracking requirements of an LVIS.

The concept behind the present invention is to combine camera sensor data and optical pattern technology so that the analysis of the video image stabilizes and refines the camera sensor data. This stabilization and refinement can be done by substituting the camera sensor data for the prediction schemes used by standard LVIS systems for searching for and tracking landmark data, or by using the camera sensor data as yet another set of landmarks, with appropriate weighting function, in the model calculation performed by standard LVIS systems. Once the camera sensors have acquired the requisite data corresponding to landmarks in the scene, the data is converted to a format that is compatible with and usable by the tracking functions of the standard LVIS and the rest of the insertion process is carried out normally.

Thus, the present invention takes advantage of camera sensor data to provide an LVIS with robust search capability independent of the details of the event location. Moreover, many of the disadvantages pertaining to camera sensor systems as described above are overcome.

The present invention comprises a typical LVIS in which one or more event cameras include sensors for sensing the zoom and focus of the lens, and the pan and tilt of the camera with respect to a fixed platform. For cameras in unstable locations, additional sensors are included which measure the motion of the substantially fixed platform with respect to a more stable stadium reference. For hand-held or mobile cameras, a still further set of sensors are included for measuring camera location and orientation with respect to a pre-determined set of reference positions. Sensor data from each camera, along with tally data from the production switcher, if necessary, is used by the LVIS to search for and detect landmark data and thereby provide a coarse indication of where an insertion should occur in the current image. Tally data takes the form of an electronic signal indicating which camera or video source is being output as the program feed by the video switcher.

The sensors and tally data essentially replace the search mode of conventional pattern recognition live video insertion systems. An accurate final determination of an insertion location is determined by using feature and/or texture analysis in the actual video image. This analysis compares the position of the features and/or texture within the video frame to their corresponding location in a common reference image or previous image of the insertion location and surroundings as described in co-pending applications Ser. No. 08/580,892 filed Dec. 29, 1995 entitled "METHOD OF TRACKING SCENE MOTION FOR LIVE VIDEO INSERTION SYSTEMS" and 60/031,883 filed Nov. 27, 1996 entitled "CAMERA TRACKING USING PERSISTANT, SELECTED, IMAGE TEXTURE TEMPLATES".

BRIEF DESCRIPTION OF THE DRAWINGS

FIG. 13 illustrates a camera fitted with pan, tilt, zoom and focus sensors.

FIG. 14 illustrates a representation of data output from an optically encoded sensor.

FIG. 15 illustrates the relationship between the transition of sensor track A, the state of sensor track B and the direction of rotation, clockwise (CW) or counter-clockwise (CCW), of the sensor.

DETAILED DESCRIPTION OF THE PREFERRED EMBODIMENT

Figure 1:
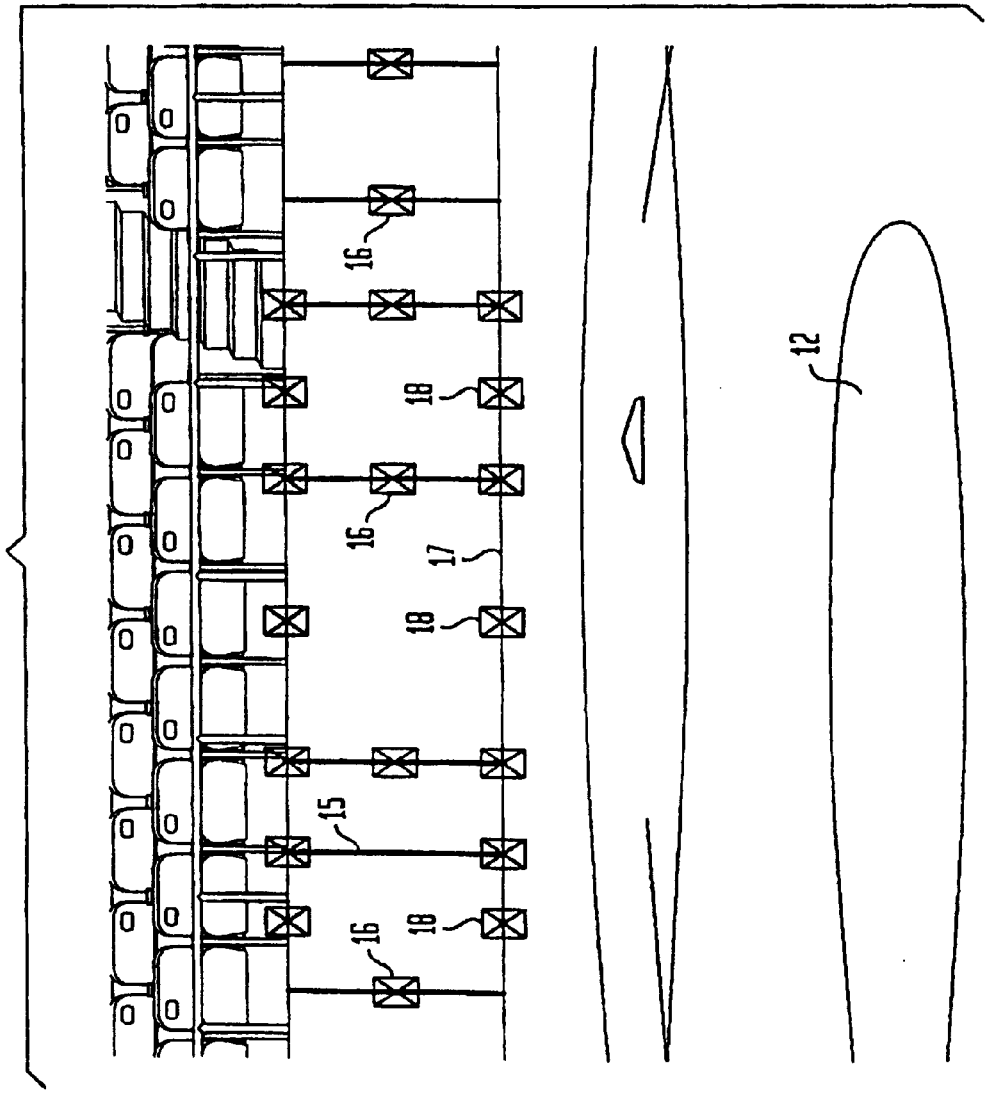
FIG. 1 is a schematic representation showing a reference video image of a scene.
Figure 2:
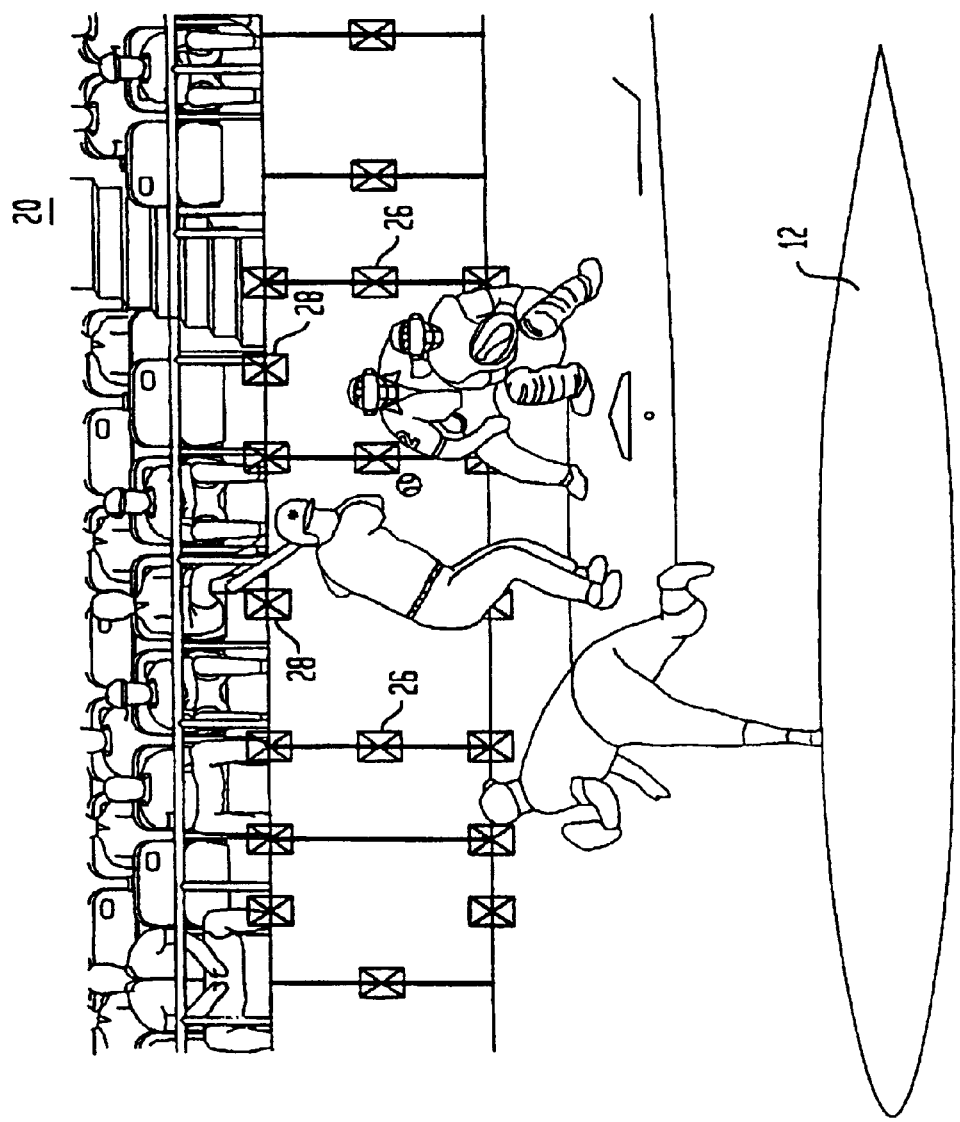
FIG. 2 is a schematic representation showing a live video image of the reference video image in FIG. 1.

During the course of this description like numbers will be used to identify like elements according to the different figures that illustrate the invention.

The standard LVIS search/detection and tracking method, as described in Ser. No. 08/580,892 filed Dec. 29, 1995 entitled "METHOD OF TRACKING SCENE MOTION FOR LIVE VIDEO INSERTION SYSTEMS", uses template correlation with zoom insensitive templates, such as edges, to follow a group of pre-designated landmarks or some subset of a group within a scene. Template correlation of landmarks provides raw position information used to follow the motion of a scene. Typically, the landmarks used may be parts of the structure in a ball park or markings on a field of play. Creating an ideal mathematical formulation of the scene to be tracked is a key part of the tracking algorithm. This ideal mathematical representation is referred to as the reference array and is simply a table of x,y coordinate values. The term "image" associated with the array is for operator convenience. Current images or scenes are related to this reference array by a set of warp parameters which define the mathematical transform that maps points in the current scene to corresponding points in the reference array. In the simple case in which rotation is ignored or kept constant the current image is mapped to the reference array as follows:

$$A'=a+bx$$

$$y'=d+by$$

where x' and y' are the coordinates of a landmark in the current scene, x and y are the coordinates of the same landmark in the reference array and b is the magnification between the reference array and the current scene, a is the translation in the x direction and d is the translation in the y direction between the reference array and the current scene.

The essence of adaptive, geographic hierarchical tracking is paying most attention to landmarks which are found at or close to their anticipated model derived positions.

The first step is to obtain an accurate velocity prediction scheme to locate the anticipated model derived position. Such a scheme estimates, via the warp parameters from the previous field or scene, where the landmarks in the current image should be. The primary difficulty with velocity prediction in interlaced video is that from field to field there appears to be a one pixel y component to the motion. The present invention handles this by using the position from the previous like field, and motion from the difference between the last two unlike fields.

Having predicted where in the current image the landmarks should be, template correlations over a 15 by 15 pixel region are then performed centered on this predicted position. These correlation patterns are then searched from the center outward looking for the first match that exceeds a threshold criteria. Moreover, each landmark has a weighting function whose value is inversely proportional to the distance the landmark is away from its anticipated model derived position. When calculating the new warp parameters for the current scene, each landmark's current position is used weighted by this function. This gives more emphasis to landmarks which are closer to their predicted positions.

A further step, necessary to compensate for camera distortion as the scene moves, is to dynamically update the reference array coordinates of the landmarks based on their current locations. This updating is done only on good landmarks, and is itself heavily weighted by the distance error weighting function. This adaptive reference array allows very accurate tracking of landmarks even as they pass through lens and perspective distortions. The danger in having an adaptive reference array is that it may get contaminated. This danger is mitigated by having three sets of reference coordinates, which are referred to as the code, game and tracking reference coordinates. When the system is initially loaded, the code reference coordinates are set to the original reference coordinates. The game and tracking coordinates are initially set equal to the code reference coordinates. Once the system locates a scene and begins tracking, the tracking coordinates are used. However, each time a scene cut occurs, the tracking coordinates are automatically reset to the game reference coordinates. At any time the operator may choose to set the current tracking coordinates equal to the game reference coordinates or to set the game reference coordinates back to the code reference coordinates. This scheme allows for adaptive reference updating with operator override capability.

The final element in the tracking scheme is a method of determining when a landmark is obscured by some object, so as to avoid spurious data in the system. A color based occlusion method is used in which a set of sensor points in a pattern around where a landmark is found are examined and if they are found to differ from the colors expected in those regions, the landmark is deemed to be occluded and not used in further calculations. The sensor points from good landmarks are used to update the reference values for expected colors of the sensor points so that the system can accommodate changing conditions such as the gradual shift from sunlight to artificial light during the course of a broadcast.

This strategy of adaptive, hierarchical tracking has proved to be a means of high precision and robust tracking of landmarks within video sequences even in the noisy, real world environment of live broadcast television.

Figures 3, 4:
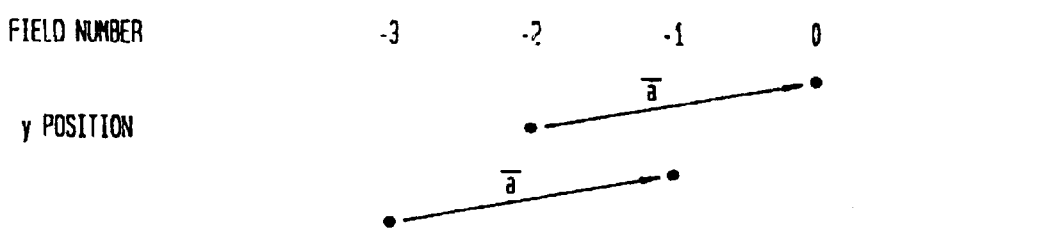
FIG. 3 is a table illustrating the elements of a typical representation of a reference array.
FIG. 4 is illustrates a schematic representation of field number versus y image position in an interlace video field.

Referring to FIG. 1, motion tracking of video images which allow seamless insertion as practiced by this invention, starts with a reference array 10 of a scene in which insertions are to be placed. Although having an actual image is a useful mental aid, this reference array is nothing more than a set of idealized x,y coordinate values which represent the position of a number of key landmark sets 16 and 18 within reference array 10. A typical table is shown in FIG. 3, illustrating the listing of x, or horizontal coordinates 31, and the y, or vertical coordinate positions 33. The positions 31 and 33 of key landmark sets 16 and 18 are used both as references against which motion can be measured and in relation to which insertions can be positioned. A typical reference array 10 of a baseball scene from a center field camera will consist of the locations of features such as the pitcher's mound 12, the back wall 14, vertical lines 15 between the pads which make up the back wall 14, and the horizontal line 17 between the back wall and the field of play on which the horizontal set of landmarks 18 are set.

The current image or scene 20 is the field from a video sequence which is presently being considered. Locations of key features or landmark sets 16 and 18 from reference array 10 also are indicated in current image 20 as measured positions 26 and 28. Measured positions 26 and 28 are related to corresponding reference array landmark locations from sets 16 and 18 by a set of warp parameters which define a mathematical transform that most accurately maps the position of points in current image 20 to the position of points in reference array 10. Such mappings are well known mathematically. See, "Geometrical Image Modification in Digital Image Processing", W. K. Pratt 2nd Edition, 1991, John Wiley and Sons, ISBN 0-471-85766.

Tracking the view from a fixed television camera, especially one with a reasonably long focal length as in most sporting events, can be thought of as mapping one two-dimensional surface to another two-dimensional surface. A general mathematical transform that accomplishes such a mapping allowing for image to image translation, zoom, shear, and rotation is given by the following six parameter model:

$$x' = a + bx + cy$$

$$y' = d + ex + fy$$

where x and y are coordinates in reference array 10,
x' and y' are the transformed coordinates in current image 20,
a is the image translation in the x direction,
b is the image magnification in the x direction,
c is a combination of the rotation, and skew in the x direction,
d is the image translation in the y direction,
e is a combination of the rotation, and skew in the y direction, and
f is the image magnification in the y direction.

The tracking algorithms and methods discussed herein can be used with the above transformation as well as other more general transformations. However, experience has shown that with a dynamically updated reference array, a simpler x,y mapping function which assumes no shear or rotation will suffice. Thus, in the simple case in which rotation is ignored or kept constant (c=e=0) and the magnification in the x and y directions is the same (b=f) the position of points in current image 20 are mapped to the position of points in reference array 10 using the following equations:

$$x' = a + bx$$

$$y' = d + by$$

where x' and y' are coordinates of a landmark in current image 20, x and y are coordinates of the same landmark in reference array 10, b is the magnification between reference array 10 and current image 20, a is the translation in the x direction, and d is the translation in the y direction. This simplified mapping scheme is used because experience has shown it to be both robust and capable of handling the limited shear, rotation, and perspective distortion present in television sports broadcasts when a dynamically updated reference array is used.

Motion tracking is the method of measuring positions of landmark sets 26 and 28 in current image 20 and using these measurements to calculate the warp parameters a, d and b, as defined by the equations above. An important part of adaptive geographic hierarchical tracking is the concept of assigning a weight to each landmark. Weights are assigned, in inverse proportion, according to the distance each landmark is detected away from where it is expected or predicted to be found. The closer a landmark is found to where it is predicted to be, the greater the weight given to that landmark in the calculation of the warp parameters linking the positions in current image 20 to the positions in reference array 10.

The first step is predicting where the landmarks 26 and 28 should be in current image 20. This is done by analyzing the landmark positions in the three previous fields. The previous position and velocity of a landmark derived from the previous model is used to estimate where the landmark will appear in the current image 20. The position and velocity calculations are complex in that both the current standard methods of television transmission, NTSC and PAL, are sent in two vertically interlaced fields. Thus, alternate horizontal scans are included in separate fields, customarily referred to as odd and even fields. In the NTSC system, each field is sent in ⅟₆₀th of a second (16.6 msecs), making a combined single frame every ⅟₃₀th of a second.

One important practical consideration in the velocity estimations is that the x and the y positions in the previous fields (−1, −2 and −3) that are used in the velocity estimations are not the measured positions, but the positions calculated using the final warp parameters derived in each of those fields. That is, in each field, x and y positions are measured for each landmark. All of the landmarks are then used to derive a single set of warp parameters a, b and d giving the mapping between the current and the reference array. That single set of warp parameters is then used to project the reference array coordinates 10 into the current image 20, giving an idealized set of landmark positions in the current image. It is this idealized set of landmark positions in each field, referred to as the model derived positions, that are used in the velocity predictions.

As illustrated in FIG. 4, the current y or vertical position of a landmark is predicted from the previous three fields. The y position in the current field (field 0) is predicted by measuring the y component of velocity as the difference between the landmark's model derived position in field −1 and field −3, which are "like" fields in that they are both either odd or even. The y velocity component is then added to the model derived y position in field −2, which is the previous field "like" the current field, to arrive at an estimate of where to find that landmark in the current field.

The prediction in the x direction could use the same algorithm or, since there is no interlace, the x direction calculation can be simpler and slightly more current. In the simpler scheme, the x component of the velocity is calculated as the difference between the landmark's model derived position in field −1 and its model derived position in field −2. This difference is then added to the model derived position in field −1 to arrive at an estimate of where to find that landmark in the current field.

Having predicted the most likely position of all the landmarks in the current image, the positions of the landmarks are then found by doing a correlation of an 8 by 8 pixel template over a 15 by 15 pixel region centered at the predicted position. Correlation or template matching is a well known technique, and in its standard form is one of the most fundamental means of object detection. See, Chapter 20, "Image Detection and Recognition of Digital Image Processing" by W. K. Pratt (2nd Edition, 1991, John Wiley and Sons, ISBN 0-471-85766). Unlike more standard methods of correlation or template matching in which the template is made to closely resemble the part of the scene it is being used to find, the templates in the present invention are synthetic, idealized both in shape and value, and are "zero-mean".

Figure 5A:
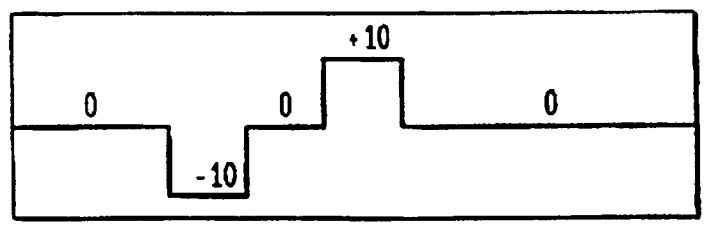
FIG. 5a illustrates a cross-sectional view of zero mean edge template.
Figure 5B:
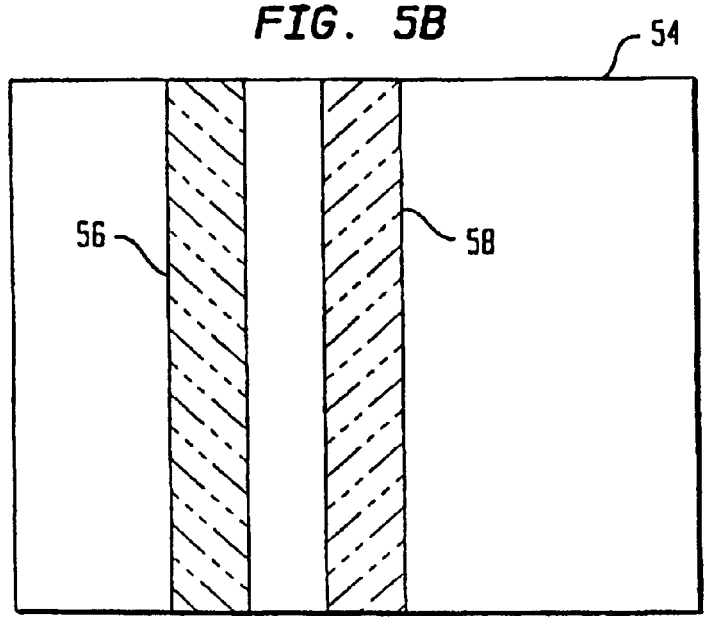
FIG. 5b illustrates a plan view of a zero mean edge template

For instance, in tracking a football goal post upright, rather than use a portion of the goal post taken from the image, the template 54 used is an edge of uniform value made from a negative directed line 56 and a positive directed line 58, and the sum of the values in the 8 by 8 template is equal to zero as shown schematically in cross-section in FIG. 5a and in plan view in FIG. 5b.

This template has the advantages of being zoom independent and will give a zero value on a surface of uniform brightness. The technique is not limited to 8 by 8 pixel templates, nor is the region over which they are correlated limited to 15 by 15 pixel regions. Further, this technique is not limited to zero mean templates either. In circumstances where only vertical and horizontal lines and edges are being tracked it is possible to reduce computation by having (1×n) correlation surfaces for following the horizontal detail, and (n×1) correlation surfaces for following the vertical detail where n is any reasonable number, usually in the range of 5–50 pixels.

Figure 6:
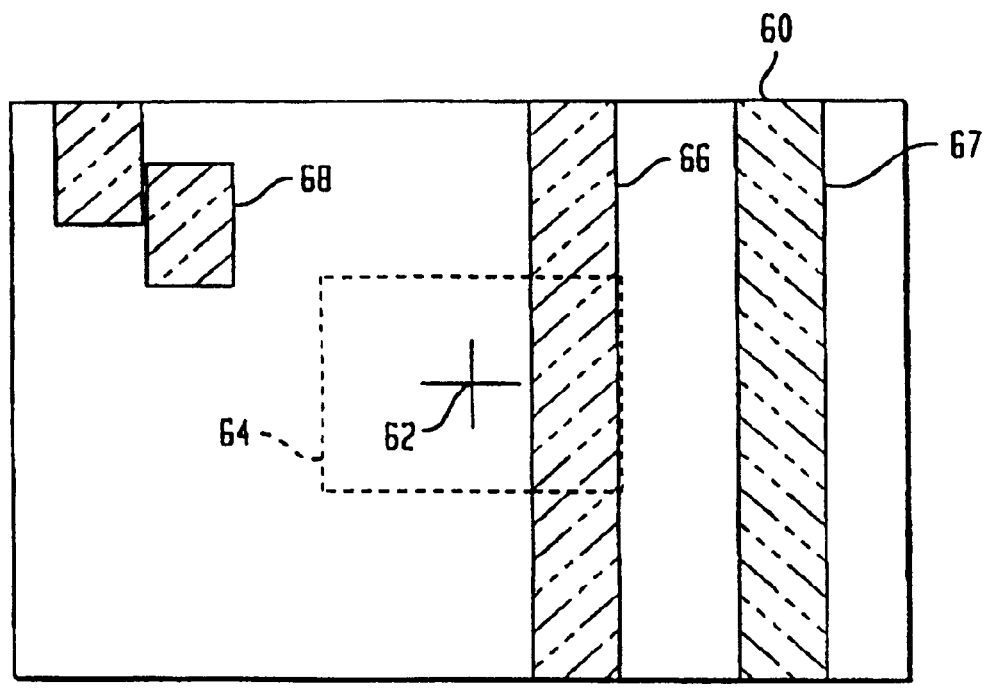
FIG. 6 illustrates a correlation surface.

The idealized, zero-mean edge template 54 is correlated over a 15 by 15 pixel region of the current image or some amplified, filtered and decimated replica of it to produce a correlation surface 60 as shown schematically in FIG. 6. This correlation surface 60 consists of a 15 by 15 array of pixels whose brightness correspond to the correlation of the image against the template when centered at that position. Typically, an edge template 54 correlated over a region of an image containing a line will give both a positive going line response 66, indicating a good match and a corresponding negative going line 67 indicating a mismatch. This mismatch line 67 can be useful in that its position and distance away from the positive going match line 66 give a measure of the width of the line and whether it is brighter or darker than its surroundings. In addition, there will be other bright pixels 68 on the correlation surface 60 corresponding to bright edge like features in the current image.

A guiding principle of the adaptive-geographic-hierarchical tracking method is to focus on landmarks and the correlation peaks indicating potential landmarks that are closest to where they are expected to be. Rather than just looking for a peak anywhere on the 15 by 15 correlation surface 60, these patterns are searched from the center outward. The simplest, and very effective, way of doing this is to first look at the central nine pixel values in the central 3 by 3 pixel region 64. If any of these pixels has a correlation value greater than a threshold then it is assumed that the pixel represents the landmark being sought and no further investigation of the correlation surface is done. The threshold is usually fifty percent of the usual landmark correlation anticipated. This 3 by 3 initial search allows motion tracking even in the presence of nearby objects that by their brightness or shape might confuse the landmark correlation, such as when the pixel marked 68 had been brighter than the pixels in the line 66. Once the pixel with the peak brightness is found, an estimate of the sub pixel position is found using the well known method of reconstructing a triangle as discussed in co-pending U.S. Pat. application Ser. No. 08/381,088. There are other sub pixel position estimating methods that may be used such as fitting higher order curves to the data.

Figure 7:
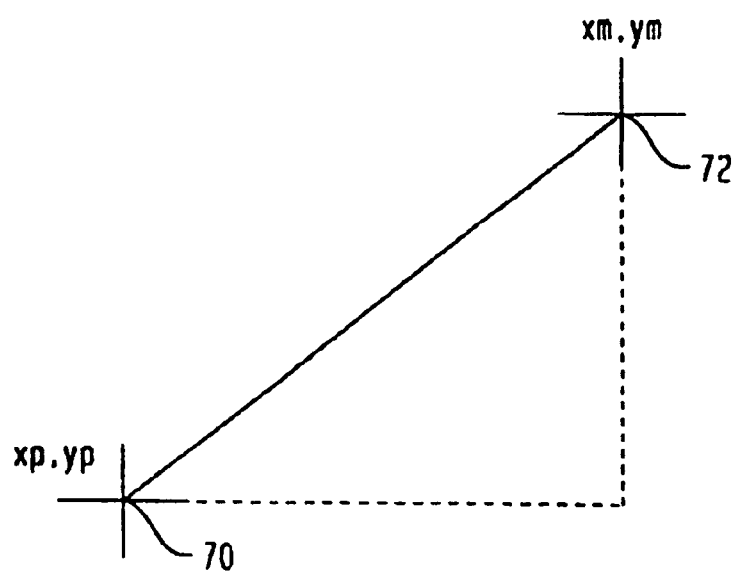
FIG. 7 illustrates a measured and predicted position on a surface.

In addition, each landmark found in a scene has an error weight associated with it based on its distance from where it is expected to be. Referring now to FIG. 7, the calculation of this error weight is based on the predicted position in the image 70, at the coordinates xp, yp and the measured position in the image 72, at the coordinates xm, ym, using the general equation:

$$ErrorWeight = \frac{g}{h + (i((xp - xm)^j + (yp - ym)^k))^l}$$

where g, h, i, j, k, and l are numerical constants chosen to vary the strength of the weighting function.

In the preferred embodiment the parameters of the equation are:

$$ErrorWeight = \frac{1.0}{1.0 + ((xp + xm)^2 + (yp - ym)^2)^{1.0}}$$

although in special circumstances, each of the parameters might have a different value to change the emphasis of the weighting. For instance, numerical constants i and j may be varied to provide a function which stays constant for a short distance and then drops rapidly.

This error weight is then used in the calculation of the warp parameters which maps points in the current image 20 to the positions in the reference array 20. In the preferred embodiment this calculation is a weighted least mean squares fit using the following matrix:

$$\begin{bmatrix} \sum (C1 \cdot C1) & \sum (nx \cdot C1) & \sum (ny \cdot C1) \\ \sum (nx \cdot C1) & \sum (nx \cdot nx) & \sum (nx \cdot ny) \\ \sum (ny \cdot C1) & \sum (nx \cdot ny) & \sum (ny \cdot ny) \end{bmatrix} \begin{bmatrix} b \\ a \\ d \end{bmatrix} = \begin{bmatrix} \sum (C1 \cdot C2) \\ \sum (nx \cdot C2) \\ \sum (ny \cdot C2) \end{bmatrix}$$

where $C1 = nx \cdot ErrorWeight \cdot xp + ny \cdot ErrorWeight \cdot yp$ $C2 = nx \cdot ErrorWeight \cdot xm + ny \cdot ErrorWeight \cdot ym$ In the case of purely horizontal landmarks, nx=0 and ny=1 and in the case of purely vertical landmarks nx=1 and ny=0. In the more general case, nx and ny are the direction cosines of vectors representing the normal to the landmarks predominant direction.

The adaptive part of the motion tracking scheme is necessary to allow for camera distortion. It also allows the system to compensate for small discrepancies between the stored idealized reference array and the actual scene as well as allowing the system to handle small slow rotation and/or shear. It further allows the system to handle any small and slowly occurring distortions. This adaptation is done by dynamically updating the reference array coordinates based on their current locations. In the present invention the adaptive part of the motion tracking is made stable by the following criteria: 1) being very careful when it is allowed to occur; 2) choosing which landmarks are allowed to participate based on how confident the system is that said landmarks are good; and 3) having the whole calculation heavily weighted by the distance error weighting function. In addition, the reference array is reset after any scene cuts.

In the preferred embodiment the dynamic updating of the reference coordinates is started after six fields of tracking and is only done on landmarks which have not been flagged by any occlusion checks and have correlation values greater than 20% and less than 200% of expected reference values, though different values may be used for all these parameters.

The measured landmark positions are back projected to the positions in the reference array using the warp parameters calculated by all the good landmarks in the current field using the equations;

$Xnr=(Xm-a)/b$ $Ynr=(Ym-d)/b$ $Xr=X0r+(ErrorWeight)^2(Xnr-X0r)$ $Yr=Y0r+(ErrorWeight)^2(Ynr-Y0r)$ where:

Xm is the measured x coordinate of the landmark,

Ym is the measured y coordinate of the landmark, a is the horizontal translation warp parameter, d is the vertical translation warp parameter, b is the magnification warp parameter, Xnr is the calculated x coordinate of a proposed new reference point based on this field's data, Ynr is the calculated y coordinate of a proposed new reference point based on this field's data, XOr is the x coordinate of the old reference point prior to update, YOr is the y coordinate of the old reference point prior to update, Xr is the x coordinate put into the table as the new reference point, and Yr is the y coordinate put into the table as the new reference point.

It is also possible to use separate tracking reference arrays for odd and even fields to improve the tracking performance with interlace video. Because of the potentially unstable nature of the adaptive reference array, the preferred embodiment has three related reference arrays, referred to as the: CODE REFERENCE, GAME REFERENCE, and TRACKING REFERENCE.

Figure 8:
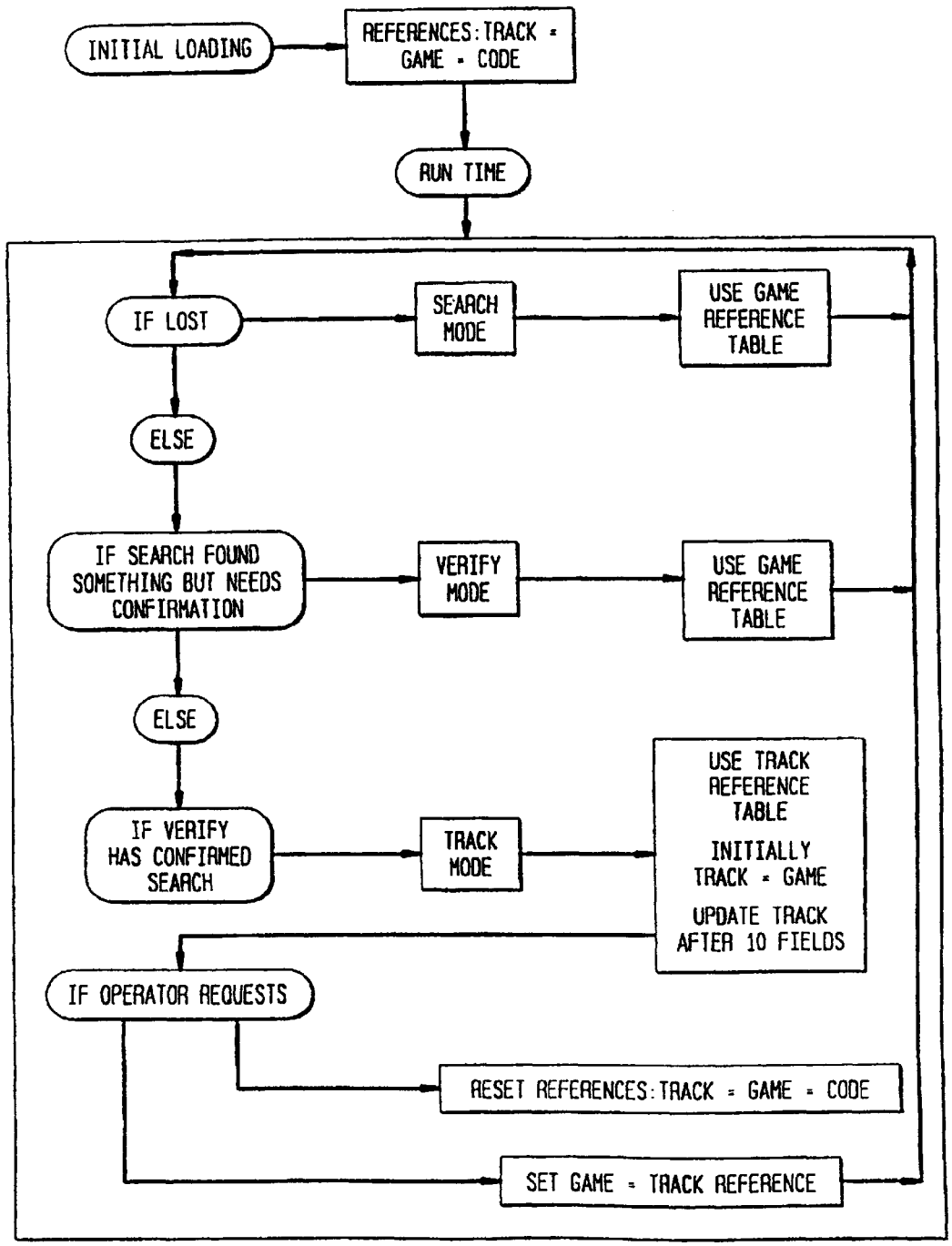
FIG. 8 illustrates a schematic flow diagram of how a track, reference, and code hierarchy of reference arrays is used to manage an adaptive reference array.

The schematic flow diagram in FIG. 8 illustrates how these three references are used. At start up, when the initial system is loaded, all three references are set to be the same, i.e. CODE REFERENCE=GAME REFERENCE=TRACKING REFERENCE, which is to say that the x and the y coordinates of the landmarks in each of the reference arrays are set to be the same as the coordinates of the landmarks in the code reference array.

At run time, when the image processing is done, the three reference arrays are used in the following manner. The game reference is used in search and verify mode and in tracking mode the tracking reference is used.

Initially the tracking reference array is set equal to the game reference array. In the preferred embodiment this occurs on the first field in which the tracking is done. In subsequent fields the tracking reference is modified as detailed above. If separate tracking reference arrays are being used for odd and even fields they would both initially be set to the game reference array.

At any time during the tracking mode, the operator may elect to copy the current tracking references into the game reference using standard computer interface tools such as a screen, keyboard, mouse, graphic user interface, trackball, touch screen or a combination of such devices. This function is useful at the start of a game. For instance, an operator may be setting up the live video insertion system to perform insertions at a particular stadium. The code reference coordinates have landmark positions based on a previous game at that stadium but the position of the landmarks may have been subtly altered in the intervening time. The code reference, however, remains good enough for search and tracking most of the time. Alternatively, by waiting for a shot, or having the director set one up prior to the game, in which all the landmarks are clear of obstruction, and allowing for the adjustment of the tracking reference to be completed, a more accurate game reference for that particular game can be achieved.

At any time, in either the tracking or search mode, the operator can elect to reset the game reference to the code reference. This allows recovery from operator error in resetting the game reference to a corrupted tracking reference.

Figure 9:
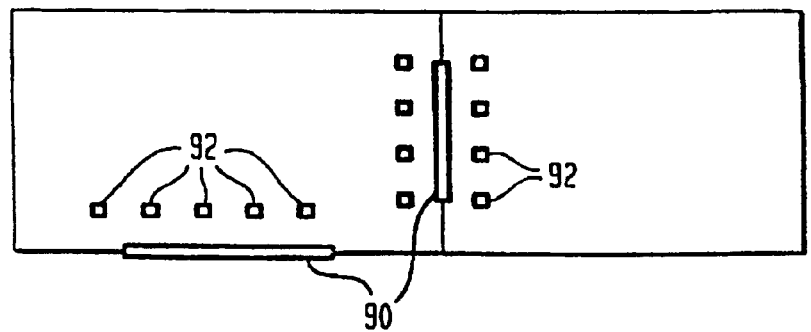
FIG. 9 illustrates a schematic view of landmarks and their associated sensor points used for color based occlusion.

An important part of the adaptive reference process is restricting the updating to landmarks which are known to be un-occluded by objects such as players. The method used for this landmark occlusion detection in the preferred embodiment is color based and takes advantage of the fact that most sports are played on surfaces which have well defined areas of fairly uniform color, or in stadiums which have substantial features of uniform color, such as the back wall in a baseball stadium. Each landmark 90 as shown in FIG. 9, has sensor points 92 associated with it. These sensor points 92, which in the preferred embodiment vary from 3 to 9 sensor points per landmark 90, are pixels in predetermined locations close to, or preferably surrounding the landmark they are associated with. More importantly, the sensor points are all on areas of reasonably uniform color. The decision on whether the landmarks are occluded or not is based on looking at the sensor points and measuring their deviation from an average value. If this deviation exceeds a pre-set value, the landmark is presumed to be occluded. Otherwise it is available for use in other calculations, such as the model calculations and the reference array updating.

The discussion up until this point has described the LVIS search/detect and track features of co-pending application Ser. No. 08/580,892 filed Dec. 29, 1995 entitled "METHOD OF TRACKING SCENE MOTION FOR LIVE VIDEO INSERTION SYSTEMS"

The concept of the present invention is to augment the velocity prediction scheme of a standard LVIS-with camera sensor data. While such action may sound trivial, it is in fact a complex undertaking that requires synchronicity between different data formats. Camera sensor data provides a "snapshot" of a complete image field which can be reduced to a two-dimensional image coordinate array where the entire image array is mapped all at once, i.e. at a single instant in time. That is to say, the pixels on the left side of the array represent the same instant in time as the pixels on the right side of the array. Motion tracking using a standard LVIS technique, however, is a continually updating process with respect to the image array coordinates. Thus, at any given instant, the pixels on the left side of an image array do not represent the same instant in time as the pixels on the right side of the image array. For the hybrid system of the present invention to perform seamlessly, such anomalies must be accounted and compensated for.

Figure 10:
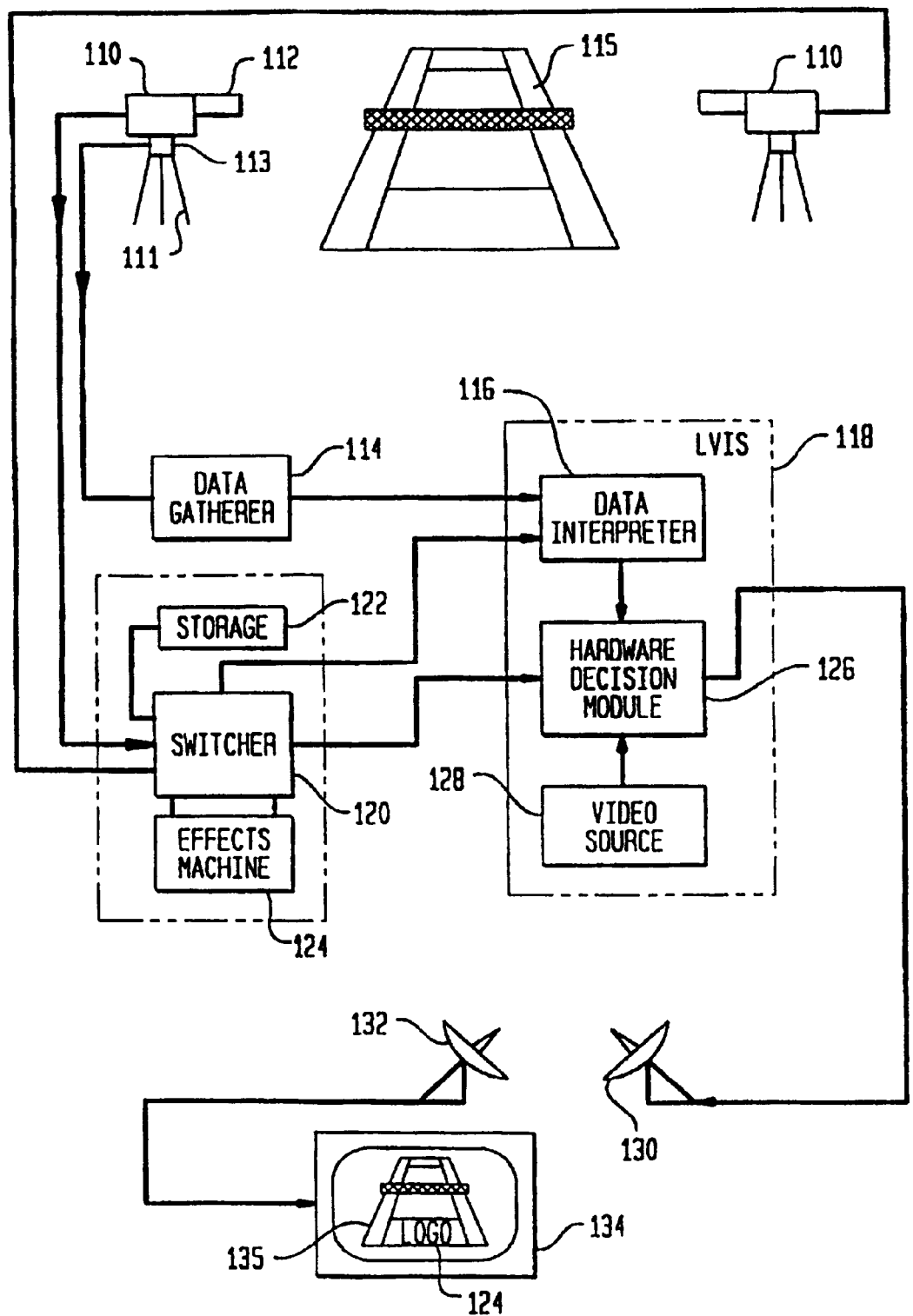
FIG. 10 is a schematic representation of an event broadcast using a combination of camera sensors and image tracking system.
Figure 11:
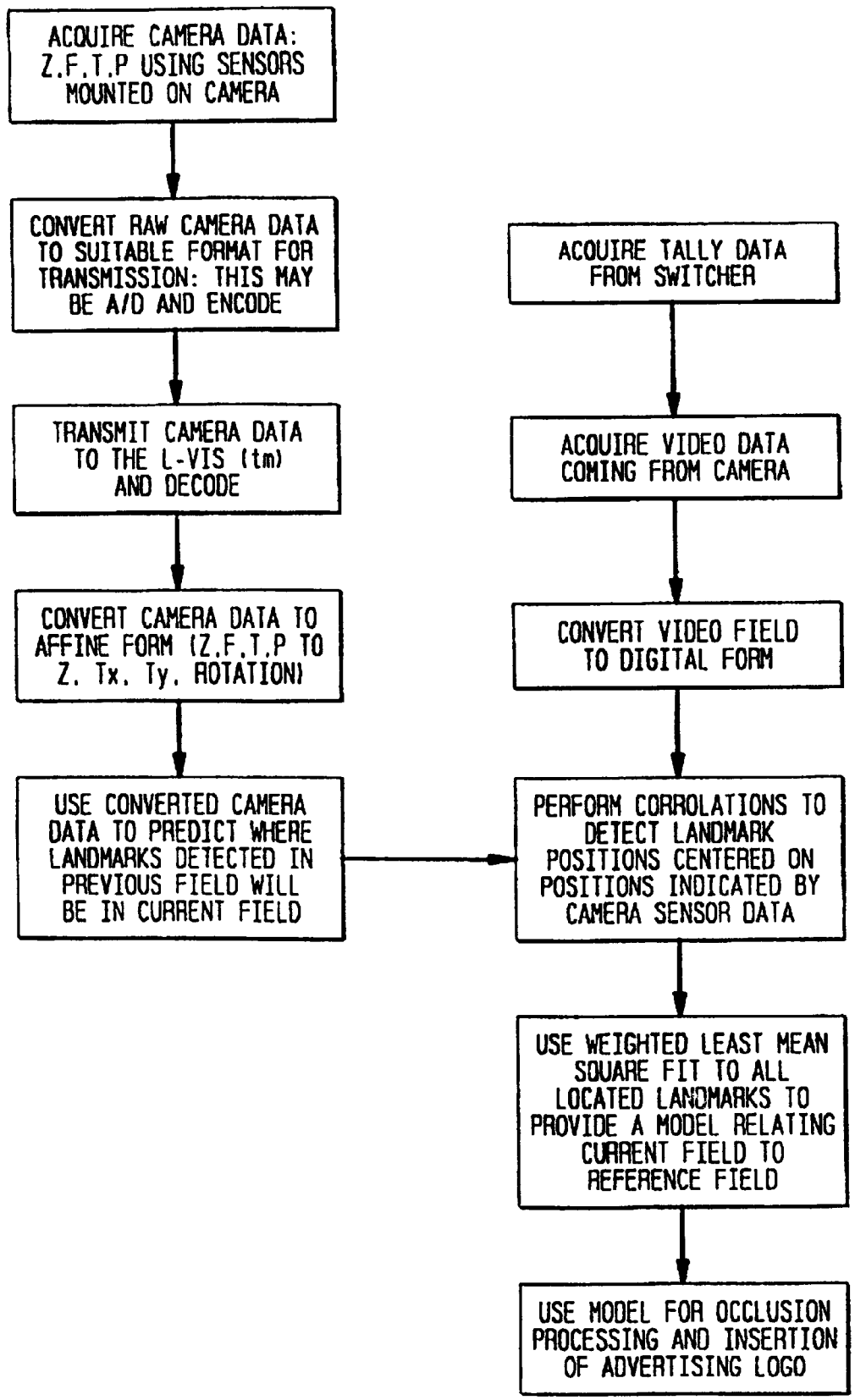
FIG. 11 is a block diagram describing the system of the present invention in which the camera data is used to predict landmark location.
Figure 12:
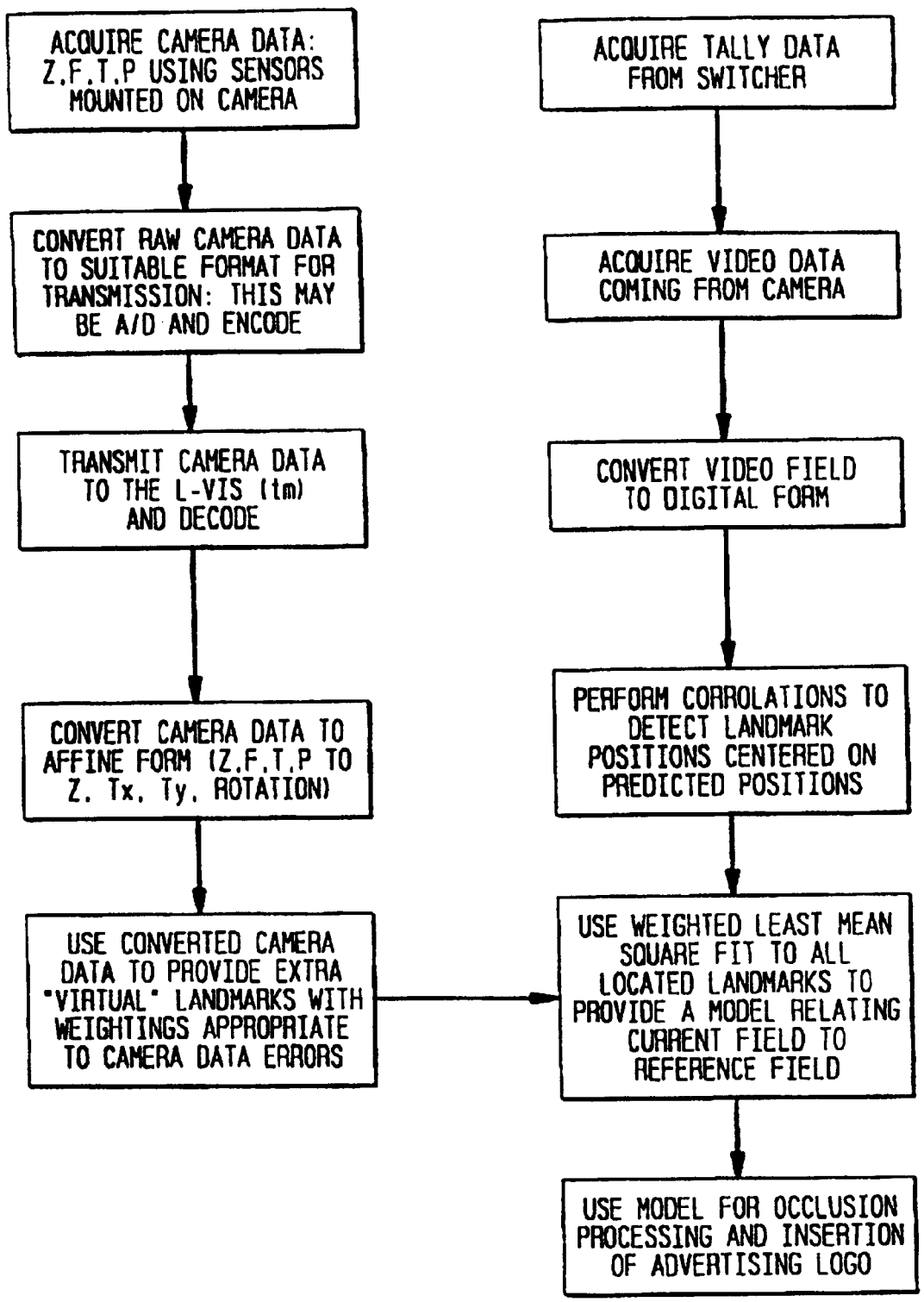
FIG. 12 is a block diagram describing the system of the present invention in which the camera data is used to provide extra "virtual" landmarks appropriately weighted to compensate for camera data errors.

Referring to FIG. 10, there is a camera 110 having lens 112 mounted on a tripod mount 111, set up to record a tennis match on a tennis court 115. The camera 110 and lens 112 are fitted with a set of sensors 113 designed to measure the pan, tilt, zoom and focus of the lens 112 and camera 110. Sensors 113 also determine whether double magnification optics are being used. Broadcast cameras usually have a "doubler" element, which can be switched in or out of the lens' train of optical elements at the turn of a knob. Use of this doubler effectively doubles the image magnification at any given setting of the lens' zoom-element. This means that a single reading of Z (the counts from the zoom-element driver) is associated with two different values of zoom or image magnification. Data gatherer 114 receives data from camera sensors 113 before feeding same to a Live Video Insertion System (LVIS) 118 having a data interpreter 116. Data interpreter 116 converts data forwarded by data gatherer 114 into a form that can be used by the LVIS system. Other similar cameras with sensors are positioned throughout the event site for recording different views of the action.

FIG. 10 also shows some of the usual broadcast equipment, such as a switcher 120, used in a television production. A switcher allows the director to choose among several video sources as the one currently being broadcast. Examples of other video sources shown in FIG. 10 include additional cameras 110 or video storage devices 122. Switcher 120 may also include an effects machine 124 such as a digital video effects machine. This allows the director to transition from one video feed to another via warpers or other image manipulation devices. Warpers are image manipulation devices that translate an image from one perspective to another, such as, for instance, a change in zoom, pan, or tilt.

The program feed is next sent to an LVIS 118. In addition to the search/detection, i.e. recognition, and tracking abilities of a typical live video insertion system, the LVIS 118 of the preferred embodiment of the present invention further includes a data interpreter 116. Data interpreter 116 interprets camera sensor data from data gatherer 114 and tally information received from switcher 120 thereby informing LVIS 118 which video source is currently being broadcast. LVIS 118 is further equipped with software and hardware decision module 126. Decision module 126 allows LVIS 118 to use sensor data in place of traditional search mode data obtained via the pattern recognition techniques previously described. Decision module 126 can switch between a conventional pattern recognition tracking mode or a mode where tracking is done via a combination of camera sensor data and pattern recognition.

Once the video has passed through LVIS 118 an indicia 136 is seamlessly and realistically inserted in the video stream. The insertion may be static, animated, or a live video feed from a separate video source 128. The resultant video signal is then sent via a suitable means 130, which may be satellite, aerial broadcast, or cable, to a home receiver 132 where the scene 135 with inserted indicia 136 is displayed on a conventional television set 134.

Referring now to FIG. 13, the set of sensors that determine the pan and tilt of camera 110 comprise precision potentiometers or optical encoders designed to measure the rotation about the horizontal 146 and vertical 142 axes. Similar sensors also determine the focus and zoom of lens 112 by measuring the translation of optical elements within lens 112. Focus and zoom motion are determined by measuring the rotation of the shafts that move the optical elements that define focus and zoom. This is done by measuring the rotation about axis 150 of handle 148 used by the camera operator to change zoom, and about axis 154 of handle 152 used by the camera operator to effect changes in focus.

Data from pan sensor 140, tilt sensor 144, zoom sensor 149, and focus sensor 153 are collected by data gatherer 114. Data gatherer 114 then takes the raw voltages and/or sensor pulses generated by the various sensors and converts them into a series of numbers in a format that can be transmitted to data interpreter 116 of LVIS 118. Data interpreter 116 may be located remotely or on-site. Data gatherer 114 may take the form of a personal computer equipped with the appropriate communications and processing cards, such as standard analog-to-digital (A/D) convertor cards and serial and parallel communications ports.

For potentiometer data, such as zoom sensor 149 and focus sensor 153, data gatherer 114 converts an analog voltage, typically in the range −3 to +3 volts, into a digital signal which is a series of numbers representing the position of the lens. These numbers may be gathered at some predetermined data rate such as once per video field or once every 6 milliseconds and forwarded to data interpreter 116 of LVIS 118. Or, LVIS 118 may send a request to data gatherer 114 requesting an update on one or more of the parameters being used.

Data from a typical optical encoder is in three tracks as illustrated in FIG. 14. Each track consists of a series of binary pulses. Tracks A and B are identical but are a quarter period out of phase with one another. A period is the combination of a low and a high pulse. In a typical optical encoder one rotation of the sensor device through 360 degrees will result in approximately 40,000 counts where a count is each time the encoder output goes from 0 to +1 or from +1 to 0. The reason for having two data tracks a quarter period out of phase is to inform data interpreter 116 which direction the sensor is being rotated. As illustrated in FIG. 15, if track A is making a transition then the state of track B determines whether the sensor is being rotated clockwise or counter-clockwise. For instance, if track A is making a transition from a high state to a low state and if track B is in a high state then the sensor is rotating clockwise. Conversely, if track B is in a low state the sensor is rotating counter-clockwise.

By studying the tracks A and B, data gatherer 114 can monitor sensor position simply by adding or subtracting counts as necessary. All that is needed is a reference point from which to start counting. The reference point is provided by track C. Track C has only two states, +1 or 0. This effectively defines a 0 degree point and a 180 degree point. Since in a practical, fixed camera setup the arc through which the camera is rotated is less than 180 degrees, we need only consider the zero setting case.

By monitoring track C transitions, data gatherer 114 is able to set the rotation counters to zero and then increment or decrement the counters by continuously monitoring tracks A and B. At suitable intervals, such as once per field or once every 6 milliseconds, the rotation position of the optical sensor can be forwarded to data interpreter 116. Alternately, at any time, LVIS 118 may send a request to data gatherer 114 for a current measurement of one or more of the parameters being monitored.

Figure 16:
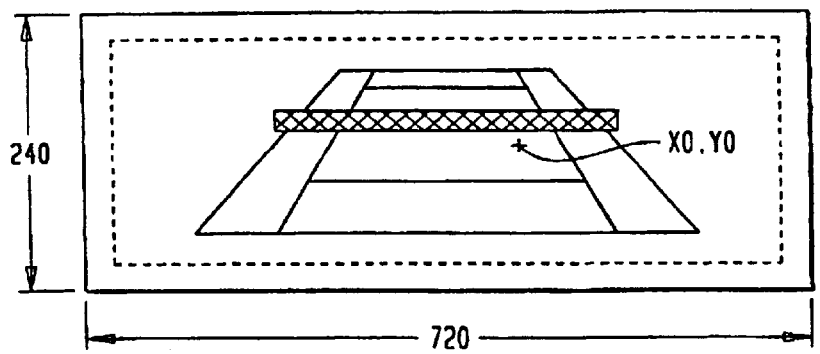
FIG. 16 illustrates a common reference image taken from a broadcast image.

The function of data interpreter 116 is to convert the digitized position and/or rotational information from data gatherer 114 into a format compatible with and usable by a typical LVIS tracking system. Referring to FIG. 16, sensor data from the camera and lens is made compatible with the LVIS tracking system by means of a common reference image.

The common reference image is a stored image that allows for mathematical modeling or translation between a conventional LVIS tracking system, such as that described in commonly owned application Ser. No. 08/580,892, entitled "METHOD OF TRACKING SCENE MOTION FOR LIVE VIDEO INSERTION SYSTEMS" and a system relying exclusively on camera sensor data. Typically, the common reference image is modeled upon the chosen tracking method, i.e. adaptive geographical hierarchical or texture analysis for instance, and the camera sensor data is translated to that chosen tracking model.

There are several important aspects to the common reference image. First is origin. The origin is chosen as the point at which the camera lens optical axis goes through the common reference image. This is typically not the center of the video image for two reasons. First, there may be a slight misalignment between the axis of the zoom elements of the lens and the optical axis of the main lens components. Second, the CCD array of the camera may not be exactly perpendicular to the optical axis of the lens.

This offset can be handled one of two ways. First, a zoom dependent skew parameter can be added to the interpretation of the data. Or, second, a zero point within the common reference image can be defined at the point where the camera lens optical axis crosses the common reference image. The zero point can be determined in practice in a number of ways. The preferred method first sets up a cross hair on the image at the center of the image. Second, zoom in on a fiducial point. A fiducial point is a fixed or reference point. Next, pan and tilt the camera until the cross-hair is centered on the fiducial point. Then zoom out as far as possible. Now move the cross hair on the image until it is centered again on the fiducial point. Lastly, repeat the second and third steps until the cross-hair stays centered on the fiducial point as the camera is zoomed in and out. The x, y coordinates of the fiducial point and of the cross-hair are now the (0,0) points of the common reference image, i.e. the origin.

The common reference image shown in FIG. 16 is an image of a stadium or event taken at some intermediate zoom with a known setting of the camera parameters pan, tilt, zoom, and focus. The common reference image is a convenience for the operator. For convenience, we make the following definitions: P=Pan counts (the number that pan encoder 40 is feeding to the data interpreter); T=Tilt counts (the number that tilt encoder 44 is feeding to the data interpreter); Z=Zoom counts (the number that zoom encoder 49 is feeding to the data interpreter); and F=Focus counts (the number that focus encoder 53 is feeding to the data interpreter). Camera sensor readings are also recorded contemporaneously with the common reference image and are given the following designations: $Z_0$=Z at the taking of the common reference image; $F_0$=F at the taking of the common reference image; $T_0$=T at the taking of the common reference image; $P_0$=P at the taking of the common reference image; and $(X_0,Y_0)$ are the coordinates in the common reference image of the (0,0) point defined above.

Three calibration constants are required to translate the camera sensor data into a form usable by a conventional LVIS image tracking system. These constants are: xp, the number of x pixels moved per count of the pan sensor at $Z_0$, $F_0$; yt, the number of y pixels moved per count of the tilt sensor at $Z_0$, $F_0$; and zf, the number of the Z count equivalent of the F count sensor at $Z_0$. xp and yt are related by a simple constant but have been identified separately for the sake of clarity.

Figure 17:
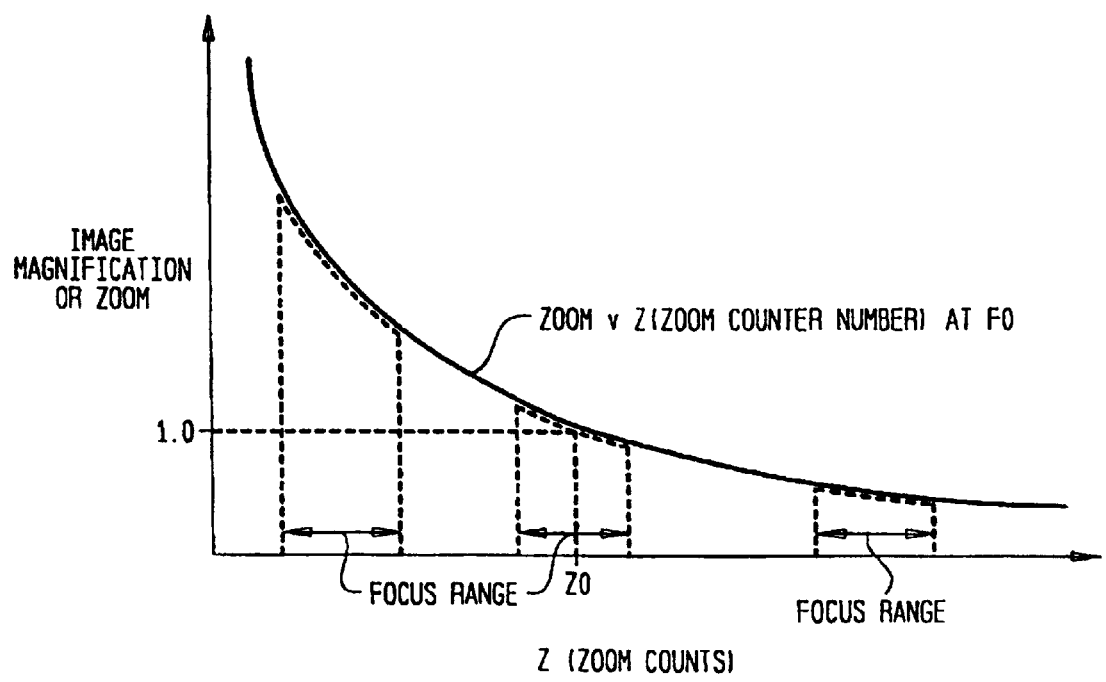
FIG. 17 illustrates a plot of Zoom (Image Magnification) against Z (the number of counts from the counter attached to the zoom lens' zoom-element driver) with the focus-element of the lens held stationary. Three other plots are overlaid on top of this Zoom against Z plot. The three overlays are plots of Zoom (Image Magnification) against F (the number of counts from the counter attached to the zoom lens' focus-element driver) at three distinct, different and fixed settings of Z (the counts from the zoom-element driver).

FIG. 17 is a linear plot of Z, the counts from the zoom counter along the x-axis, versus the zoom along the y-axis. The zoom at the common reference image settings is the unit zoom. As can be seen from the dotted lines, a side effect of adjusting the camera focus element is an alteration in the image magnification or zoom. The nature of the alteration is very similar to the nature of the alteration in image magnification produced by zoom adjustment. However, the change in image magnification (zoom) brought about by adjusting the focus-element through its entire range is significantly smaller than the change in image magnification brought about by adjusting the camera zoom element through its entire range.

This can be understood graphically by considering two sets of plots. First, a graph is made of Image Magnification (Zoom) vs. the adjustment of the zoom elements of the lens (as measured by counting the number of rotations, Z, of the screw shaft moving the zoom-elements in the zoom lens), with the focus-element of the zoom lens kept at a fixed setting. This first plot is called the Magnification vs. Zoom plot.

Second, a number of graphs are made of Image Magnification vs. the adjustment of the focus element of the lens (as measured by counting the number of rotations, F, of the screw shaft moving the focus-elements in the zoom lens) at a number of distinct settings of Z, the position of the zoom-element. These graphs are called the Magnification vs. Focus plots.

The Magnification vs. Focus plots can then be overlaid on to the Magnification vs. Zoom plot. By compressing the focus axis of the Magnification vs. Focus plots, the shape of the Magnification vs. Focus curve can be made to match the local curvature of the Magnification vs. Zoom plot, as shown in FIG. 17.

The important point is that the degree of compression of the Focus axis necessary to make the Focus curves match the Zoom curve is the same for each of the Magnification vs. Focus curves, despite their being made at different, fixed values of Z. This means that it is possible to simplify the mathematics of the interaction of zoom and focus on the image size by treating zoom and focus adjustments in a similar fashion. In particular, in determining image size or magnification, it is possible to interpret the data from the focus sensor (the counter measuring the position of the focus-element) as being equivalent to data from the zoom sensors (the counter measuring the position of the zoom-element). All that is needed to make the Zoom and Focus data equivalent is a simple modification of the Focus data by a single off-set value and a single multiplication factor. Equivalent zoom counts are defined by:

$$Z_{EC}=zf(F-F_0)$$

zf is a calibration constant determined by plotting zoom against Z counts, and then overlaying the zoom against F counts at particular zooms. By adjusting the F counts so that the zoom from the focus fits the zoom curve, the constant zf can be found. The same thing can be done analytically by first determining the relationship between zoom and Z counts, and the using that relationship to fit zoom to F counts, by adjusting zf.

In the preferred embodiment, zoom was fitted to Z using the following exponential function using a least squares fit:

$$z=e^{(aZ_0^2+bZ_0+c)}$$

There may also be a lookup table to convert the raw zoom counts into zoom, or a combination of lookup table and a mathematical interpolation which may be similar to the expression in the equation above.

Calibration constants xp and yt are measured by pointing the camera at one or more points in the common reference image, i.e. centering the cross-hair on the optical axis of the lens and recording the P and T values. By measuring the pixel distance in the common reference image between the selected points and the (0,0) point, calibration constants xp and yt are calculated by means of the following two equations:

$$xp=(X-X_0)/(Y-Y_0)$$

$$yt=(Y-Y_0)/(T-T_0)$$

Constants xp, yt, zf, a, b and c are used with reference constants, $Z_0$, $F_0$, $P_0$, $T_0$, image tracking software, or to calculate the position of a point in the current image whose location is known with respect to a reference array of the common reference image.

In the simplest affine representation, ignoring rotation and assuming zoom is the same in the x and y directions the position of an object can be related to its position in the common reference image by the equations:

$$x_i=Zx_r+t_x$$

$$y_i=Zy_r+t_y$$

where $x_i$ and $y_i$ are the x and y position of an object in the current image, $x_r$ and $y_r$ are the x and y position of the same object in the common reference image, Z is the zoom between the current image and the common reference image, and $t_x$ and $t_y$ are x and y translations between the current image and the common reference image. In the conventional LVIS tracking equations, Z, $t_x$ and $t_y$ are solved for by measuring the position of a set of known landmarks, using a weighted least squares fit. Having found Z, $t_x$ and $t_y$, any other point in the common reference image can then be mapped into the current image using the equations for $x_i$ and $y_i$.

From equations above it can be seen that Z is simply:

$$Z = \frac{e^{(a\mu^2+b\mu+c)}}{e^{(aZ_0^2+bZ_0+c)}}$$

where $\mu$ is the combined zoom and focus counts as defined by:

$$\mu=Z+zf(F-F_0)$$

$t_x$ and $t_y$ are found from the camera sensors using the relationships:

$$t_x=xp(P-P_0)$$

$$t_y=yt(T-T_0)$$

In the preferred embodiment, data interpretation unit 116 is either software or hardware implementation, or a combination of software and hardware implementation of the equations converting sensor data P, T, Z and F into Z, $t_x$ and $t_y$, having been calibrated by defining $P_0$, $T_0$, $Z_0$, $F_0$, $X_0$, $Y_0$, zf, xp and yt.

The x and y position of a point can be expressed directly in terms of $P_0$, $T_0$, $Z_0$, $F_0$, $X_0$, $Y_0$, zf, xp and yt by:

$$x_i=x_iZ+xp(P-P_0)$$

$$y_i=y_iZ+yt(T-T_0)$$

Whichever implementation is used, the implementation in hardware or software may be by the analytic expressions detailed above, by lookup tables which express or approximate the expressions, the experimental data the expressions were derived from, or by a combination of lookup tables, analytic expressions and experimental data.

The LVIS can now use the translated camera sensor data in a number of ways. Whichever method is used, however, must compensate for lens distortion of the particular lens being used.

One method for using the translated camera data is to use the Z, $t_x$ and $t_y$ affine conversion for search only, and then switch to conventional tracking. This means that the lens distortion can be compensated for conventionally by having a deformable common reference image as described in detail in commonly owned co-pending applications Ser. Nos. 08/563,598 and 08/580,892 entitled "SYSTEM AND METHOD FOR INSERTING STATIC AND DYNAMIC IMAGES INTO A LIVE VIDEO BROADCAST" and "METHOD OF TRACKING SCENE MOTION FOR LIVE VIDEO INSERTION SYSTEMS" respectively.

A second application for using translated camera data is to use it to supplement the tracking capability of the system by using the Z, $t_x$ and $t_y$ affine conversion to create one or more image-centric landmarks, which are always visible, but which have a weighting factor that always gives an error of about 2 pixels, and then feed these extra landmarks into a matrix based landmark tracking system as explained in detail in co-pending patent application Ser. No. 08/580,892 filed Dec. 29, 1995 entitled "METHOD OF TRACKING SCENE MOTION FOR LIVE VIDEO INSERTION SYSTEMS". The flexible common reference image would have to be extended to include flexible camera reference parameters.

A third method for using the translated camera data is to supplement the tracking capability of the system by using the Z, $t_x$ and $t_y$ affine conversion to predict, or as part of the prediction, where optical tracking landmarks should be in the current image, and then use landmark or texture tracking to improve whatever model is being used to relate the current image to the reference array to the extent that recognizable structure is available. Texture tracking is described in co-pending provisional application Ser. No. 60/031,883 filed Nov. 27, 1996 entitled "CAMERA TRACKING USING PERSISTANT, SELECTED, IMAGE TEXTURE TEMPLATES". This approach can be used for any model representation including full affine and perspective. Distortion compensation is more difficult, especially if the supplementation is going to be modular—i.e. available on, for instance, the zoom, x offset (or horizontal translation) and y offset (or vertical translation) separately and in any combination thereof. One robust way is to have a function or look up table that maps the distortion.

Having determined the model relating the current image to the common reference image, the remainder of the LVIS, including insertion occlusion, can be used normally, as described in detail in co-pending patent application Ser. No. 08/662,089 entitled "SYSTEM AND METHOD OF REAL-TIME INSERTIONS INTO VIDEO USING ADAPTIVE OCCLUSION WITH A SYNTHETIC COMMON REFERENCE IMAGE".

Figure 18:
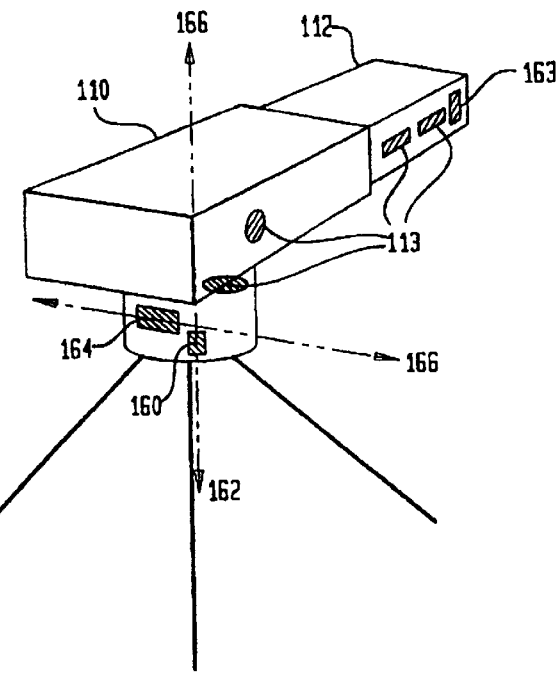
FIG. 18 illustrates a camera fitted with accelerometers (sensors) for detecting camera motion.

In an alternative embodiment of the invention illustrated in part in FIG. 18, in addition to the pan, tilt, zoom and focus sensors 113 already described, there are two additional sensors 160 and 164 fitted in the transition module by which the camera 110 and lens 112 are attached to the tripod mount 111. These additional sensors 160 and 164 are accelerometers which measure acceleration in two orthogonal directions 162 and 166. The data from the accelerometers is fed to the data gathering unit 114, where it is integrated twice with respect to time to provide the current displacement of the camera in the x and y directions. Displacement data is fed to data interpreting unit 116, where it is multiplied by some previously determined calibration constant, and added to the $t_x$ and $t_y$ components of the translated affine transform or multiplied by a related but different calibration constant and added directly to the pan and tilt counts respectively for use in the direct conversion into image coordinates.

In a simplified version of this alternative embodiment, only the accelerometer 160 measuring acceleration in the vertical direction is added to the pan, tilt, zoom and focus sensors 113, as the most common problem with supposedly stationary cameras is that they are mounted on unstable platforms and the vertical shift is the major problem.

In a modification of the simplified version of the alternative embodiment, a second accelerometer 163 is fitted at the front of the lens 112 so that camera compliance or oscillation in the vertical direction, independent of tilt about the axis 146, can also be measured and made use of in ascertaining the direction in which the camera 110 and lens 112 are pointing at any given time.

Figure 19:
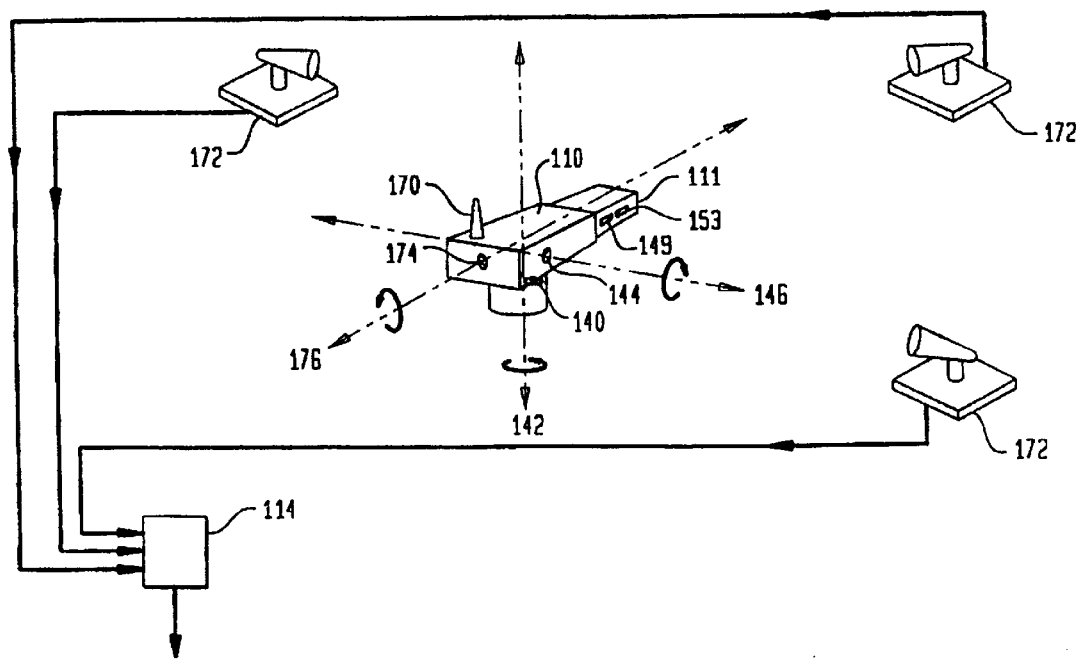
FIG. 19 illustrates three fixed receiving stations used to track the motion of a mobile camera fitted with a transmitter.

In another, alternative embodiment of the invention illustrated in FIG. 19, zoom and focus sensors 149 and 153 fitted to lens 112 are the same as in the preferred embodiment, but tilt and pan sensors 140 and 144 are changed, and there is an additional rotational sensor 174, and there is an additional Radio Frequency (RF) or Infra Red (IR) transmitter 170 attached. The tilt sensor 144 is a plum bob potentiometer, measuring tilt from the normal to the local, gravitationally defined surface of the earth. The rotational sensor 174 is also a plum bob potentiometer, or a optical encoded sensor with a gravity sensitive zero indicator, designed to measure the rotation of the camera around the axis 176. The pan sensor 140 is a sensitive, electronic compass measuring the horizontal rotation away from a local magnetic axis, which may for instance be the local magnetic north. The RF or IR transmitter 170 puts out suitably shaped pulses at predetermined, precisely timed intervals, which are picked up by two or more receivers 172 located in suitable positions in the stadium. By measuring the difference in the arrival time of the pulses at the receivers 172 the location of the camera in the stadium can be calculated to within a few millimeters. The data from the receivers 172 and the camera sensors 140, 144, 149 and 153 is then fed to data interpreter 116 in the LVIS system. By combining the data, the system can calculate the position and orientation of the camera 110, as well as the focus and zoom of the lens 112. In this way a hand held or mobile camera can be accommodated. In the affine model representation, the earlier equations have been extended to include cross terms to deal with the rotation, e.g.

$$x_i = Zx_r + \beta y_r + t_x$$

$$y_i = Zy_r + \beta x_r + t_y$$

where (variables) is a transformation constant to account for the extra rotational degree of freedom allowed by a hand held camera.

Figure 20:
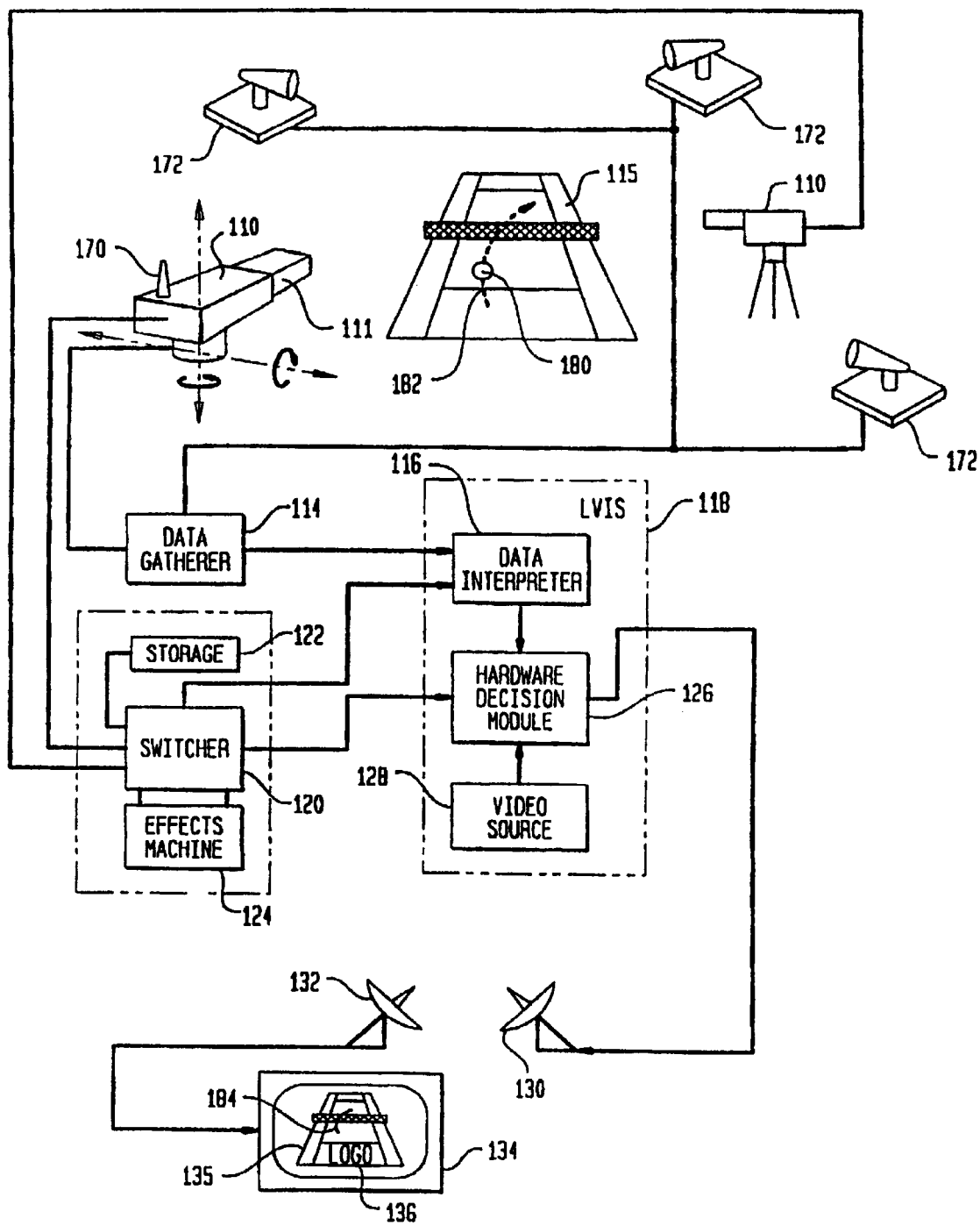
FIG. 20 illustrates a broadcast situation in which the camera and an object of interest to the event, such as a tennis ball are both fitted with transmitters.

In another, alternative embodiment of the invention, illustrated in FIG. 20, the system can handle both hand-held or mobile cameras and can determine the position of objects of interest to the sport being played. For instance, in a tennis match being played on court 15, the ball 80 could have a transmitter concealed in it, which may be a simple Radio Frequency (RF) or Infra Red (IR) transmitter, which is emitting suitably shaped pulses at predetermined, precisely timed intervals that are differentiated from transmitter 170 attached to mobile camera 110, either by timing, frequency, pulse shape or other suitable means. The receivers 172, located in suitable positions in the stadium, now measure both the difference in the arrival time of the pulses emitted by the camera transmitter 170 and the object transmitter 180. The system is now able to locate the instantaneous position of both the camera 110 and the ball with transmitter 180. The data from the camera 110 and the receivers are fed to the data gatherer 114 and then to the data interpreter 116. The data interpreter 116 can now infer the location, orientation, zoom and focus of the camera 110 and lens 112, which can, as described in detail previously, provide search information to the LVIS system and may also be used to advantage in the track mode of the LVIS system. Furthermore, the data interpreter 116 can also provide information about the location of an object of interest 180 in the current image, which may be used, for instance to provide viewer enhancements such a graphic 84 on the final output showing the trajectory 182 of the object of interest.

It is to be understood that the apparatus and method of operation taught herein are illustrative of the invention. Modifications may readily be devised by those skilled in the art without departing from the spirit or scope of the invention.

What is claimed is:

1. A method for tracking motion from field to field in a sequence of related video images that are scanned by at least one camera having one or more hardware sensor devices, the method comprising the steps of:

a) establishing an array of idealized x and y coordinates representing a reference array having a plurality of landmarks where each landmark has unique x and y coordinates;

b) mapping x and y coordinates in a current image to said x and y coordinates in said reference array;

c) acquiring camera sensor data from said hardware sensor device, said camera sensor data representing the position and orientation of the camera;

d) predicting the future location of said landmark coordinates, x' and y', using said camera sensor data, wherein prediction errors due to changes between two successive fields are minimized by adding (i) the field to field difference in landmark location calculated from said camera sensor data to (ii) the landmark position x, y previously located.

2. The method of claim 1 wherein said mapping is achieved according to the following relationships;

$$x' = a + bx + cy$$

$$y' = d + ex + fy$$

where:

x is a horizontal coordinate in the reference array, y is a vertical coordinate in the reference array, x' is a horizontal coordinate in the current scene, y' is a vertical coordinate in the current scene, a is a warp parameter for horizontal translation of the object in the x direction, b is a warp parameter for magnification between the reference array and the current image in the x direction, c is a warp parameter for a combination of rotation and skew in the x direction, d is a warp parameter for vertical translation of the object in the y direction, e is a warp parameter for a combination of rotation and skew in the y direction, and f is a warp parameter for magnification between the reference array and the current image in the y direction.

3. The method of claim 2 wherein said video images are vertically interlaced where images from field to field alternate between like and unlike fields.

4. The method of claim 3 wherein said predicting the future location of said landmark coordinates, x' and y', for said interlaced video images is based on a detected change of position of said landmark from the previous like field.

5. The method of claim 4 further comprising the steps of:

e) searching for one of said landmarks in said current image by means of correlation using a template where the search is conducted over a substantial region spanning the predicted location of said landmark;

f) multiplying the results of said correlation search in step (e) by a weighting function giving greater weight to correlations closer in distance to the predicted location of said landmark to yield a weighted correlation surface;

g) searching said weighted correlation surface for its peak value.

6. The method of claim 5 further comprising the steps of:

h) determining new warp parameters a,b,c,d,e and f for a current image based on said landmark's current position in a current image weighted by said weighting function for that landmark, wherein emphasis is given to landmarks which are closer to their predicted position.

7. The method of claim 6 wherein said weighting function comprises the following relationship:

$$ErrorWeight = \frac{g}{h + (i((xp - xm)^j + (yp - ym)^k))^l}$$

where:

g,h,i,j,k, and l are numerical constants;

xp is the predicted x coordinate location of said landmark;

xm is the measured x coordinate position of said landmark;

yp is the predicted y coordinate location of said landmark; and, ym is the measured y coordinate position of said landmark.

8. The method of claim 7 further including the step of:

i) updating said landmark locations in said reference array according to the location of said landmarks in said current image, wherein said updating is performed based upon well identified landmarks and according to said landmark weighting function.

9. The method of claim 8 further comprising the step of i) establishing three types of reference arrays prior to broadcast including;

i) a code reference array having landmark coordinates equal to said reference landmark coordinates, ii) a game reference array having landmark coordinates initially set equal to said code reference array coordinates, and, iii) a tracking reference array having landmark coordinates initially set equal to said code reference array coordinates.

10. The method of claim 9 further comprising the steps of:

k) changing said tracking reference array of coordinates during a broadcast; and, l) resetting the tracking reference array of coordinates to said game reference array of coordinates after a scene cut.

11. The method of claim 10 wherein said video system is controlled by an operator and said method further comprises the step of:

m) selectively choosing to set said current tracking reference array of coordinates equal to said game reference array of coordinates or to set said game reference array of coordinates back to said code reference array of coordinates, wherein said operator can update or override the game or tracking reference array of coordinates.

12. The method of claim 11 further comprising the steps of:

n) establishing a set of sensor points in a pattern around the location of each said landmark said sensor points being able to detect changes in color and illumination;

o) determining if said sensor points are different in color or illumination from the expected color or illumination; and, p) excluding said landmark from future calculations if said color or illumination is substantially different from what was expected, wherein said landmark is deemed to be occluded if said color or illumination at said sensor points is substantially different from the expected color or illumination.

13. The method of claim 12 wherein said correlation template is a 15 by 15 pixel window.

14. The method of claim 1 wherein said mapping is achieved according to the following relationships;

$$x'=a+bx$$

$$y'=d+by$$

where:

x is a horizontal coordinate in the reference array, y is a vertical coordinate in the reference array, x' is a horizontal coordinate in the current scene, y' is a vertical coordinate in the current scene, b is a warp parameter for magnification between the reference array and the current image, a is a warp parameter for horizontal translation of the object in the x direction, and, d is a warp parameter for vertical translation of the object in the y direction.

15. The method of claim 4 further comprising the steps of:

q) searching for one of said landmarks in said current image by means of correlation using a template where the starting point of the search is substantially centered at the predicted location of said landmark;

r) performing said search beginning from said predicted location and proceeding outward looking for a match; and, s) discontinuing said search for said landmark when said match exceeds a threshold value.

16. The method of claim 6 wherein said weighting function comprises the following relationship:

$$ErrorWeight = \frac{1.0}{1.0 + ((xp + xm)^2 + (yp - ym)^2)^{1.0}}$$

where:

xp is the predicted x coordinate location of said landmark;

xm is the measured x coordinate position of said landmark;

yp is the predicted y coordinate location of said landmark; and, ym is the measured y coordinate position of said landmark.

17. A method of merging a primary video stream into a secondary video stream so that the combined video stream appears to have a common origin from video field to video field even as the primary video stream is modulated by changes in camera orientation and settings, said apparent common origin achieved by using pattern recognition analysis of the primary video stream to stabilize and refine camera sensor data representing the orientation and settings of the primary video stream source camera, said method comprising the steps of:

t) acquiring camera sensor data from at least one camera outfitted with hardware sensors which measure the orientation and settings of the camera, u) converting the camera sensor data to a format suitable for transmission, v) transmitting the converted camera sensor data to a live video insertion system, w) converting the camera sensor data to affine form,
x) predicting where landmarks in the previous field of video will be in the current field of video based upon said camera sensor data,
y) performing correlations to detect landmark positions centered about landmark positions predicted by the camera sensor data, and
z) creating a model relating a reference field of video to the current field of video using a weighted least mean square fit for all located landmarks.

18. The method of claim 17 wherein the orientation and settings of said at least one camera comprise focus, zoom, pan, and tilt.

19. The method of claim 17 wherein the format suitable for transmission is a numeric series obtained by converting the acquired camera sensor data from an analog base to a digital base.

20. A method of merging a primary video stream into a secondary video stream so that the combined video stream appears to have a common origin from video field to video field even as the primary video stream is modulated by changes in camera orientation and settings, said apparent common origin achieved by using pattern recognition analysis of the primary video stream to stabilize and refine camera sensor data representing the orientation and settings of the primary video stream source camera, said method comprising the steps of:
aa) acquiring camera sensor data from at least one camera outfitted with hardware sensors which measure the orientation and settings of the camera,
bb) converting the camera sensor data to a format suitable for transmission,
cc) transmitting the converted camera sensor data to a live video insertion system,
dd) converting the camera sensor data to affine form,
ee) performing correlations to detect landmark positions centered about landmark positions predicted by the camera sensor data,
ff) creating virtual landmarks using said camera sensor data, said virtual landmarks appropriately weighted for camera sensor data error, and
gg) creating a model relating a reference field of video to the current field of video using a weighted least mean square fit for all located and virtual landmarks.

21. The method of claim 20 wherein the orientation and settings of said at least one camera comprise focus, zoom, pan, and tilt.

22. The method of claim 20 wherein the format suitable for transmission is a numeric series obtained by converting the acquired camera sensor data from an analog base to a digital base.

23. A method for tracking motion from field to field in a sequence of related video images that are scanned by at least one camera having one or more hardware sensor devices, the method comprising the steps of:
hh) obtaining a set of image templates from a current video image that meet certain template capturing criteria and storing said image templates in memory;
ii) acquiring camera sensor data from said hardware sensing device, said camera sensor data representing the position and orientation of the camera;
jj) using said camera sensor data in determining the position of each stored image template with respect to the current image;
kk) calculating a transform model using the determined template position with respect to the current image, said transform model to be used to correspond reference position data to current image position data;
ll) purging image templates from memory that do not meet certain template retention criteria; and
mm) obtaining new image templates from said current image to replace the image templates that were purged.

24. A method for tracking motion from field to field in a sequence of related video images that are scanned by at least one camera having hardware sensor devices, said hardware sensor devices to include an accelerometer, the method comprising the steps of:
nn) establishing an array of idealized x and y coordinates representing a reference array having a plurality of landmarks where each landmark has unique x and y coordinates;
oo) mapping x and y coordinates in a current image to said x and y coordinates in said reference array;
pp) acquiring camera sensor data from said hardware sensor devices, said camera sensor data representing the position, orientation, and oscillation of the camera;
qq) predicting the future location of said landmark coordinates, x' and y', using said camera sensor data,
wherein prediction errors due to changes between two successive fields are minimized by adding (i) the field to field difference in landmark location calculated from said camera sensor data to (ii) the landmark position x, y previously located.

25. A method of merging a primary video stream into a secondary video stream so that the combined video stream appears to have a common origin from video field to video field even as the primary video stream is modulated by changes in camera orientation and settings, said apparent common origin achieved by using pattern recognition analysis of the primary video stream to stabilize and refine camera sensor data representing the orientation and settings of the primary video stream source camera, said method comprising the steps of:
rr) obtaining a set of image templates from a current video image that meet certain template capturing criteria and storing said image templates in memory,
ss) acquiring camera sensor data from at least one camera outfitted with hardware sensors which measure the orientation and settings of the camera,
tt) converting the camera sensor data to a format suitable for transmission,
uu) transmitting the converted camera sensor data to a live video insertion system,
vv) converting the camera sensor data to affine form,
ww) predicting where image templates in the previous field of video will be in the current field of video based upon said camera sensor data,
xx) performing correlations to detect image template positions centered about image template positions predicted by the camera sensor data, and
yy) creating a model relating a reference field of video to the current field of video using a weighted least mean square fit for all image templates,
zz) purging image templates from memory that do not meet certain template retention criteria, and
aaa) obtaining new image templates from said current image to replace the image templates that were purged.

26. A method of merging a primary video stream into a secondary video stream so that the combined video stream appears to have a common origin from video field to video field even as the primary video stream is modulated by camera oscillation and changes in camera orientation and settings, said apparent common origin achieved by using pattern recognition analysis of the primary video stream to stabilize and refine camera sensor data representing the motion, orientation and settings of the primary video stream source camera, said method comprising the steps of:

bbb) acquiring camera sensor data from at least one camera outfitted with hardware sensors which measure the acceleration, orientation and settings of the camera, ccc) converting the camera sensor data to a format suitable for transmission, ddd) transmitting the converted camera sensor data to a live video insertion system, eee) converting the camera sensor data to affine form, fff) predicting where landmarks in the previous field of video will be in the current field of video based upon said camera sensor data, ggg) performing correlations to detect landmark positions centered about landmark positions predicted by the camera sensor data, and hhh) creating a model relating a reference field of video to the current field of video using a weighted least mean square fit for all located landmarks.

27. A method of merging a primary video stream into a secondary video stream so that the combined video stream appears to have a common origin from video field to video field even as the primary video stream is modulated by changes in camera orientation and settings, said apparent common origin achieved by using pattern recognition analysis of the primary video stream to stabilize and refine camera sensor data representing the orientation and settings of the primary video stream source camera, said method comprising the steps of:

iii) obtaining a set of image templates from a current video image that meet certain template capturing criteria and storing said image templates in memory, jjj) acquiring camera sensor data from at least one camera outfit with hardware sensors which measure the orientation and settings of the camera, kkk) converting the camera sensor data to a format suitable for transmission, lll) transmitting the converted camera sensor data to a live video insertion system, mmm) converting the camera sensor data to affine form, nnn) performing correlations to detect image template positions centered about image template positions predicted by the camera sensor data, ooo) creating virtual image templates using said camera sensor data, said virtual image templates appropriately weighted for camera sensor data error, ppp) creating a model relating a reference field of video to the current field of video using a weighted least mean square fit for all located and virtual image templates, qqq) purging image templates from memory that do not meet certain template retention criteria, and rrr) obtaining new image templates from said current image to replace the image templates that were purged.

28. A method of merging a primary video stream into a secondary video stream so that the combined video stream appears to have a common origin from video field to video field even as the primary video stream is modulated by camera oscillation and changes in camera orientation and settings, said apparent common origin achieved by using pattern recognition analysis of the primary video stream to stabilize and refine camera sensor data representing the acceleration, orientation and settings of the primary video stream source camera, said method comprising the steps of:

sss) acquiring camera sensor data from at least one camera outfitted with hardware sensors which measure the acceleration, orientation and settings of the camera, ttt) converting the camera sensor data to a format suitable for transmission, uuu) transmitting the converted camera sensor data to a live video insertion system, vvv) converting the camera sensor data to affine form, www) performing correlations to detect landmark positions centered about landmark positions predicted by the camera sensor data, xxx) creating virtual landmarks using said camera sensor data, said virtual landmarks appropriately weighted for camera sensor data error, and yyy) creating a model relating a reference field of video to the current field of video using a weighted least mean square fit for all located and virtual landmarks.

29. A method of merging a primary video stream into a secondary video stream so that the combined video stream appears to have a common origin from video field to video field even as the primary video stream is modulated by changes in camera orientation and settings, said apparent common origin achieved by using pattern recognition analysis of the primary video stream to stabilize and refine camera sensor data representing the orientation and settings of the primary video stream source camera, said method comprising the steps of:

zzz) acquiring camera sensor data from at least one camera outfitted with hardware sensors which measure the orientation and settings of the camera, aaaa) converting the camera sensor data to a format suitable for transmission, bbbb) transmitting the converted camera sensor data to a live video insertion system, cccc) converting the camera sensor data to a form and a coordinate system useable by the live video insertion system, dddd) predicting where landmarks will be in the current field of video based on said camera sensor data, eeee) creating a model relating a reference field of video to the current field of video using a weighted least mean squares fit for all located landmarks, ffff) obtaining a set of image templates from a current video image that meet certain template capturing criteria and storing said image templates in memory, gggg) in subsequent fields of video using the predicted positions of said image templates as a starting point to determine the current position of each stored image template, hhhh) in subsequent fields of video calculating a transform model using the determined template positions to correspond reference position date to image position data in those subsequent fields, iiii) purging image templates from memory that do not meet certain template retention criteria, and jjjj) obtaining new image templates from said current image to replace the image templates that were purged.

* * * * *

UNITED STATES PATENT AND TRADEMARK OFFICE
CERTIFICATE OF CORRECTION

PATENT NO. : 6,100,925
DATED : August 8, 2000
INVENTOR(S) : Rosser, et al

Page 1 of 2

It is certified that error appears in the above-indentified patent and that said Letters Patent is hereby corrected as shown below:

In column 7, line 23, please replace "A'" with --x'--.

In column 11, line 63, please replace "xp + xm" with --xp - xm--.

In column 24, line 39 (claim 16), please replace "xp + xm" with --xp - xm--.

In section [56], please add the following references:

- U.S. Patent No. 4,084,184
- U.S. Patent No. 4,090,708
- U.S. Patent No. 4,975,770
- U.S. Patent No. 5,305,107
- U.S. Patent No. 5,353,392
- U.S. Patent No. 5,543,856
- U.S. Patent No. 5,627,915
- U.S. Patent No. 5,808,695
- U.S. Patent No. 5,892,554
- U.S. Patent No. 5,917,553
- U.S. Patent No. 5,953,076
- International Publication No. WO 95/10919

UNITED STATES PATENT AND TRADEMARK OFFICE
CERTIFICATE OF CORRECTION

PATENT NO. : 6,100,925
DATED : August 8, 2000
INVENTOR(S) : Rosser, et al

It is certified that error appears in the above-indentified patent and that said Letters Patent is hereby corrected as shown below:

–    Orad Hi-Tec Systems, "Replay 2000 - The Ultimate Workstation for Sport Commentators and Producers," April 1995.

Signed and Sealed this

Seventeenth Day of April, 2001

*Attest:*

NICHOLAS P. GODICI

*Attesting Officer*     *Acting Director of the United States Patent and Trademark Office*